US012621799B2

(12) United States Patent
Saha et al.

(10) Patent No.: US 12,621,799 B2
(45) Date of Patent: May 5, 2026

(54) PRE-PAGING CONFIGURATION

(71) Applicant: QUALCOMM Incorporated, San Diego, CA (US)

(72) Inventors: Chiranjib Saha, Lakeside, CA (US); Umesh Phuyal, San Diego, CA (US); Geetha Priya Rajendran, Bangalore (IN); Bharat Shrestha, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 18/459,410

(22) Filed: Aug. 31, 2023

(65) Prior Publication Data

US 2025/0081161 A1     Mar. 6, 2025

(51) Int. Cl.
*H04W 68/02*          (2009.01)
*H04W 76/30*          (2018.01)

(52) U.S. Cl.
CPC ........... *H04W 68/02* (2013.01); *H04W 76/30* (2018.02)

(58) Field of Classification Search
CPC ... H04W 68/02; H04W 68/005; H04W 76/30; H04W 76/11
See application file for complete search history.

(56) References Cited

U.S. PATENT DOCUMENTS

| | | | |
|---|---|---|---|
| 2022/0256501 A1 | 8/2022 | Peng et al. | |
| 2022/0338159 A1* | 10/2022 | Phuyal ................. | H04W 24/10 |
| 2022/0394667 A1 | 12/2022 | Berggren et al. | |
| 2023/0096752 A1* | 3/2023 | Gupta ................... | H04W 60/04 |
| | | | 370/329 |
| 2023/0125555 A1* | 4/2023 | Gupta .................... | H04W 8/22 |
| | | | 370/329 |
| 2024/0057034 A1* | 2/2024 | Shrivastava .......... | H04W 68/02 |
| 2024/0137908 A1* | 4/2024 | Agiwal ................. | H04W 68/02 |
| 2024/0284403 A1* | 8/2024 | Agiwal ................. | H04W 68/02 |
| 2024/0323911 A1* | 9/2024 | Liu .................... | H04W 36/0033 |
| 2025/0113335 A1* | 4/2025 | Jano ...................... | H04L 5/0053 |
| 2025/0142529 A1* | 5/2025 | Agiwal ................. | H04W 68/02 |
| 2025/0234414 A1* | 7/2025 | Xu ......................... | H04W 68/02 |
| 2025/0274926 A1* | 8/2025 | Khlass .................. | H04W 68/02 |

FOREIGN PATENT DOCUMENTS

CN          108990150 B     2/2022

OTHER PUBLICATIONS

International Search Report and Written Opinion—PCT/US2024/039796—ISA/EPO—Nov. 18, 2024.

* cited by examiner

*Primary Examiner* — Robert C Scheibel
(74) *Attorney, Agent, or Firm* — Harrity & Harrity, LLP

(57) ABSTRACT

Various aspects of the present disclosure generally relate to wireless communication. In some aspects, a first network entity may establish a first user equipment (UE) identifier (ID) associated with pre-paging. The first network entity may transmit, with information associated with the first UE ID, a request associated with paging to a second network entity. Numerous other aspects are described.

30 Claims, 23 Drawing Sheets

600 ⟶

1110 Establish a first UE ID associated with pre-paging

1120 Monitor for the first UE ID in a pre-paging message

1100

1310 Receive, with information associated with a first UE ID, a request associated with paging from a first network entity 1320 Transmit a pre-paging message to a UE associated with the first UE ID

1300

PRE-PAGING CONFIGURATION

INTRODUCTION

Aspects of the present disclosure generally relate to wireless communication and to techniques and apparatuses for pre-paging.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed at a first network entity. The method may include establishing a first user equipment (UE) identifier (ID) associated with pre-paging. The method may include transmitting, with information associated with the first UE ID, a request associated with paging to a second network entity.

Some aspects described herein relate to a method of wireless communication performed at a UE. The method may include establishing a first UE ID associated with pre-paging. The method may include monitoring for the first UE ID in a pre-paging message.

Some aspects described herein relate to a method of wireless communication performed at a first network entity. The method may include receiving a pre-paging configuration with a first UE ID. The method may include generating a mapping between the pre-paging configuration and a second UE ID associated with the first UE ID. The method may include transmitting a request associated with paging with the second UE ID and the pre-paging configuration.

Some aspects described herein relate to a method of wireless communication performed at a second network entity. The method may include receiving, with information associated with a first UE ID, a request associated with paging from a first network entity. The method may include transmitting a pre-paging message to a UE associated with the first UE ID.

Some aspects described herein relate to an apparatus for wireless communication at a first network entity. The apparatus may include one or more memories and one or more processors coupled to the one or more memories. The one or more processors may be configured to cause the first network entity to establish a first UE ID associated with pre-paging. The one or more processors may be configured to cause the first network entity to transmit, with information associated with the first UE ID, a request associated with paging to a second network entity.

Some aspects described herein relate to an apparatus for wireless communication at a UE. The apparatus may include one or more memories and one or more processors coupled to the one or more memories. The one or more processors may be configured to cause the UE to establish a first UE ID associated with pre-paging. The one or more processors may be configured to cause the UE to monitor for the first UE ID in a pre-paging message.

Some aspects described herein relate to an apparatus for wireless communication at a first network entity. The apparatus may include one or more memories and one or more processors coupled to the one or more memories. The one or more processors may be configured to cause the first network entity to receive a pre-paging configuration with a first UE ID. The one or more processors may be configured to cause the first network entity to generate a mapping between the pre-paging configuration and a second UE ID associated with the first UE ID. The one or more processors may be configured to cause the first network entity to transmit a request associated with paging with the second UE ID and the pre-paging configuration.

Some aspects described herein relate to an apparatus for wireless communication at a second network entity. The apparatus may include one or more memories and one or more processors coupled to the one or more memories. The one or more processors may be configured to cause the second network entity to receive, with information associated with a first UE ID, a request associated with paging from a first network entity. The one or more processors may be configured to cause the second network entity to transmit a pre-paging message to a UE associated with the first UE ID.

Some aspects described herein relate to a non-transitory computer-readable medium that stores a set of instructions for wireless communication by a first network entity. The set of instructions, when executed by one or more processors of the first network entity, may cause the first network entity to establish a first UE ID associated with pre-paging. The set of instructions, when executed by one or more processors of the first network entity, may cause the first network entity to transmit, with information associated with the first UE ID, a request associated with paging to a second network entity.

Some aspects described herein relate to a non-transitory computer-readable medium that stores a set of instructions for wireless communication by a UE. The set of instructions, when executed by one or more processors of the UE, may cause the UE to establish a first UE ID associated with pre-paging. The set of instructions, when executed by one or more processors of the UE, may cause the UE to monitor for the first UE ID in a pre-paging message.

Some aspects described herein relate to a non-transitory computer-readable medium that stores a set of instructions for wireless communication by a first network entity. The set of instructions, when executed by one or more processors of the first network entity, may cause the first network entity to receive a pre-paging configuration with a first UE ID. The set of instructions, when executed by one or more processors of the first network entity, may cause the first network entity to generate a mapping between the pre-paging configuration and a second UE ID associated with the first UE ID. The set of instructions, when executed by one or more processors of the first network entity, may cause the first network entity to transmit a request associated with paging with the second UE ID and the pre-paging configuration.

Some aspects described herein relate to a non-transitory computer-readable medium that stores a set of instructions for wireless communication by a second network entity. The set of instructions, when executed by one or more processors of the second network entity, may cause the second network entity to receive, with information associated with a first UE ID, a request associated with paging from a first network entity. The set of instructions, when executed by one or more processors of the second network entity, may cause the second network entity to transmit a pre-paging message to a UE associated with the first UE ID.

Some aspects described herein relate to an apparatus for wireless communication. The apparatus may include means for establishing a first UE ID associated with pre-paging. The apparatus may include means for transmitting, with information associated with the first UE ID, a request associated with paging to another apparatus.

Some aspects described herein relate to an apparatus for wireless communication. The apparatus may include means for establishing a first UE ID associated with pre-paging. The apparatus may include means for monitoring for the first UE ID in a pre-paging message.

Some aspects described herein relate to an apparatus for wireless communication. The apparatus may include means for receiving a pre-paging configuration with a first UE ID. The apparatus may include means for generating a mapping between the pre-paging configuration and a second UE ID associated with the first UE ID. The apparatus may include means for transmitting a request associated with paging with the second UE ID and the pre-paging configuration.

Some aspects described herein relate to an apparatus for wireless communication. The apparatus may include means for receiving, with information associated with a first UE ID, a request associated with paging from another apparatus. The apparatus may include means for transmitting a pre-paging message to a UE associated with the first UE ID.

Aspects generally include a method, apparatus, system, computer program product, non-transitory computer-readable medium, user equipment, base station, network entity, network node, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
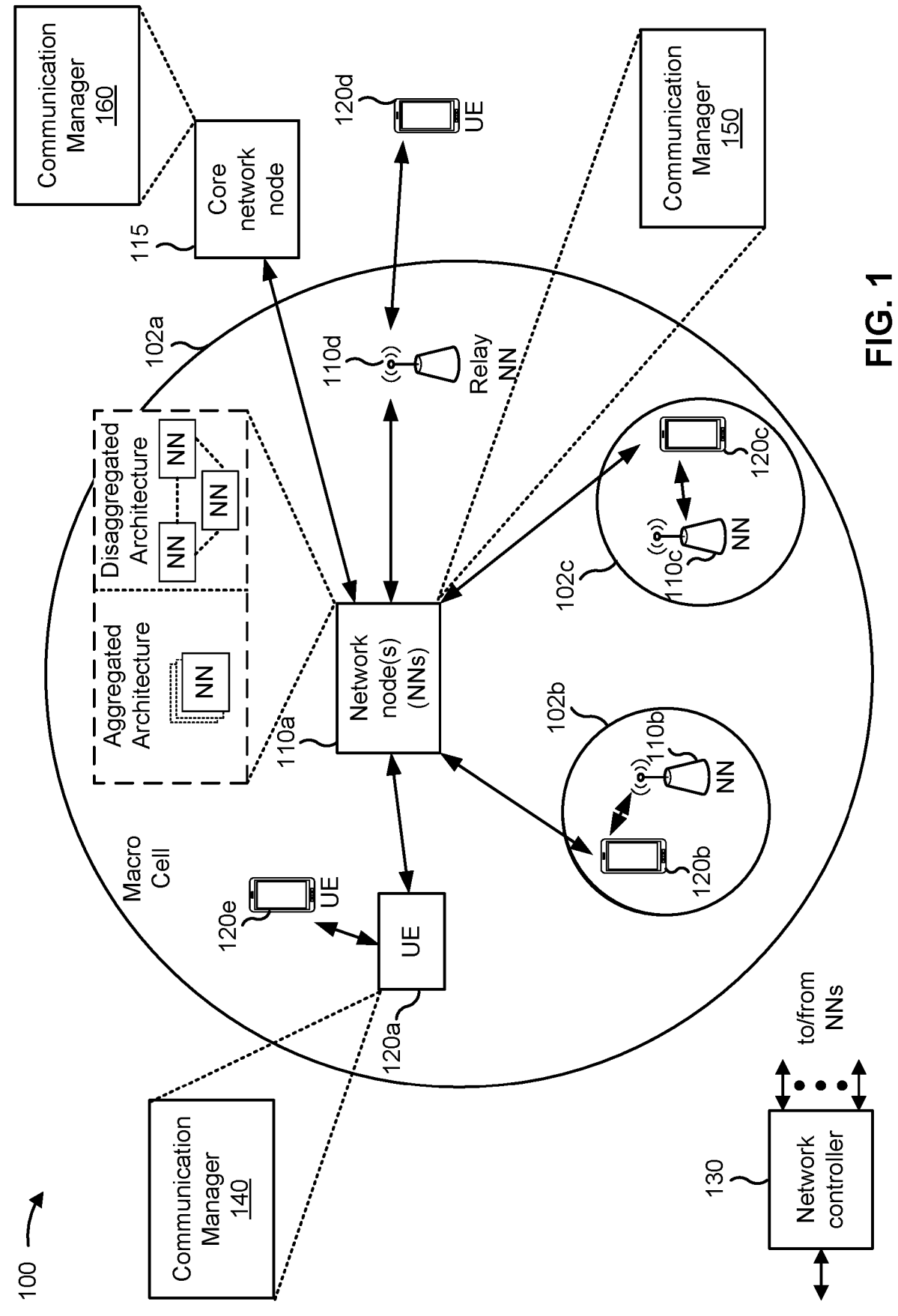
FIG. 1 is a diagram illustrating an example of a wireless network, in accordance with the present disclosure.

Various aspects relate generally to wireless communication and more particularly to paging user equipments (UEs). Some aspects more specifically relate to paging of a UE by a radio access network (RAN) network entity. The UE may enter an idle state, and the RAN network entity may page the UE. Paging may include the RAN network entity sending a paging message to the UE to indicate that the UE is to enter a connected state.

The paging by the RAN network entity may be controlled by a core network. The core network may include, for example, an access and mobility management function (AMF), which may be a network entity in the core network that acts as a termination point for signaling and/or mobility management with respect to the UE. The AMF may request the RAN network entity to page the UE. The RAN network entity may then page the UE to indicate that the UE can connect to the RAN network entity. More specifically, the RAN network entity may first transmit a physical downlink control channel (PDCCH) message to the UE. The PDCCH message may include a paging radio network temporary identifier (P-RNTI) identifying the UE and allocating resources for a paging message. The RAN network entity may then transmit the paging message to the UE on a physical downlink shared channel (PDSCH) in the allocated resource. The UE may set up a connection with the RAN network entity (including a bearer) based on receiving the paging message and performing a random access channel (RACH) procedure with the RAN network entity.

Only upon successful completion of bearer setup with the RAN network entity does the user interface of the UE notify the user about an incoming message, such as an incoming call (via ringing, vibration, notification). In certain sce-narios, when paging and the RACH is successful, a subsequent physical uplink shared channel (PUSCH) message may fail if a downlink link budget is insufficient (too much power loss on the link). In other scenarios, even when paging is successful, the RACH may fail due to weak signals on an uplink because of poor or deep coverage. In certain examples, the paging message may not be received if the link is weak (e.g., if the smartphone is in a pocket or in a backpack).

To address these issues, in some examples, the RAN network entity may perform pre-paging, in which the RAN network entity transmits a pre-paging message. This pre-paging message may include information identifying a UE and indicating that the UE is to connect to the RAN network entity and/or perform an action in preparation for paging. For example, the pre-paging message may enable the UE, which may have an insufficient link budget, to alert the user on a display interface of the UE to move the UE to a better location, to improve a link to the RAN network entity. The RAN network entity may repeat the paging after a period of time. For example, in some aspects, rather than simply determining that paging has failed if no response to the paging is received from the UE, the RAN network entity may transmit a pre-paging message to the UE on a pre-paging channel. Pre-paging may include transmitting a pre-paging message ahead of a paging message or in preparation for paging. The UE may receive the pre-paging message and alert the user of the UE to move to a better location. The RAN network entity may repeat the paging after a specified amount of time or expect another monitoring occasion (MO) session for paging. By using a pre-paging message, the paging may ultimately be successful.

However, in one scenario, a paging UE identifier (ID) assigned by the RAN network entity (48 bits) may be too long in length for use on a pre-paging channel that the UE is to monitor for pre-paging. In another scenario, the AMF may maintain a UE context for the UE that includes information (e.g., identities, parameters, capabilities) for a logical connection of the UE. The UE may enter a radio resource control (RRC) idle state (e.g., go to sleep, exit coverage). If the UE enters the RRC idle state, the RAN network entity may clear the UE context. Accordingly, the RAN network entity may not be able to use the paging UE ID at a future time since the paging UE ID may correspond to the UE context at the RAN, which is cleared once the UE moves to an RRC idle state. Furthermore, since the RAN clears the UE context, the RAN may not be able to store any code (e.g., temporary UE ID) assigned to the UE for pre-paging monitoring. Without storing pre-paging information for a paging UE ID, the RAN network entity may have to allocate pre-paging resources and assign a code to the UE again when the UE is to be paged. This increases latency and consumes signaling resources.

According to various aspects described herein, the AMF may establish a new UE ID, such as a pre-paging UE ID for monitoring pre-paging. The AMF and the UE may establish the pre-paging UE ID, which, in one example, may be derived from a paging UE ID (e.g., fifth generation (5G) serving temporary mobile subscriber identity (S-TMSI)). In some aspects, the pre-paging UE ID may be shorter in length than a paging UE ID. The paging UE ID may be too long in length for use in a pre-paging message and/or on a pre-paging channel, and the pre-paging UE ID may be short enough in length to be used in a pre-paging message and/or on a pre-paging channel. The AMF may request that the RAN network entity pre-page the UE with the pre-paging UE ID. The RAN network entity may transmit a pre-paging message with the pre-paging UE ID to the UE. The UE may respond to the pre-paging message based at least in part on the pre-paging UE ID. In some aspects, the UE may derive the pre-paging UE ID with information included in a paging message. In this way, a UE may respond to a pre-paging message even if the UE is not in good coverage, because the UE is more likely to receive and respond to the pre-paging message (e.g., smaller than the pre-paging message or on a pre-paging channel). The RAN network entity may avoid having to resend a pre-paging resource allocation for the UE. As a result, pre-paging may be successful. Also, latency may be reduced and signaling resources may be conserved because paging messages are not wasted.

In some aspects, the AMF may store UE-specific pre-paging resources, such as a pre-paging configuration. The pre-paging configuration may indicate pre-paging resources and a temporary UE ID (e.g., code such as a radio network temporary identifier (RNTI)) assigned to the UE for monitoring across multiple cells/group IDs and codes). For example, the AMF may maintain a database of the codes assigned to a UE. The AMF may generate a mapping between a pre-paging configuration (e.g., including an assigned code) and a UE paging identity for the UE (paging UE ID). The AMF may transmit a paging request to the RAN network entity with the pre-paging configuration and the paging UE ID. The RAN network entity may transmit a pre-paging message using the pre-paging configuration (including the temporary UE ID). The UE may monitor for pre-paging with the temporary UE ID and receive the pre-paging message. In this way, the AMF may indicate the temporary UE ID assigned to the UE (in the pre-paging configuration) when the AMF transmits the paging request to the RAN network entity. By maintaining a mapping of the pre-paging configuration and the paging UE ID assigned to the UE, the RAN network entity may avoid having to resend a pre-paging resource allocation. As a result, paging may be successful. Latency may be reduced and signaling resources may be conserved if paging messages do not fail.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120c), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. A core network node is shown by core network node 115. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110. As the network node 110 may include a core network node, the core network node 115 may include components described for the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first network entity (e.g., a network node 110, a core network node 115) may include a communication manager 160. As described in more detail elsewhere herein, the communication manager 160 may establish a first UE ID associated with pre-paging. The communication manager 160 may transmit, with information associated with the first UE ID, a request associated with paging to a second network entity.

In some aspects, the communication manager 160 may receive a pre-paging configuration with a first UE ID. The communication manager 160 may generate a mapping between the pre-paging configuration and a second UE ID associated with the first UE ID. The communication manager 160 may transmit a request associated with paging with the second UE ID and the pre-paging configuration. Additionally, or alternatively, the communication manager 160 may perform one or more other operations described herein.

In some aspects, a UE 120 (e.g., a UE 120) may include a communication manager 140. As described in more detail elsewhere herein, the communication manager 140 may establish a first UE ID associated with pre-paging. The communication manager 140 may monitor for the first UE ID in a pre-paging message. Additionally, or alternatively, the communication manager 140 may perform one or more other operations described herein.

In some aspects, a second network entity (e.g., a network node 110) may include a communication manager 150. As described in more detail elsewhere herein, the communication manager 150 may receive, with information associated with a first UE ID, a request associated with paging from a first network entity. The communication manager 150 may transmit a pre-paging message to a UE associated with the first UE ID. Additionally, or alternatively, the communication manager 150 may perform one or more other operations described herein.

As indicated above, FIG. 1 is provided as an example. Other examples may differ from what is described with regard to FIG. 1.

Figure 2:
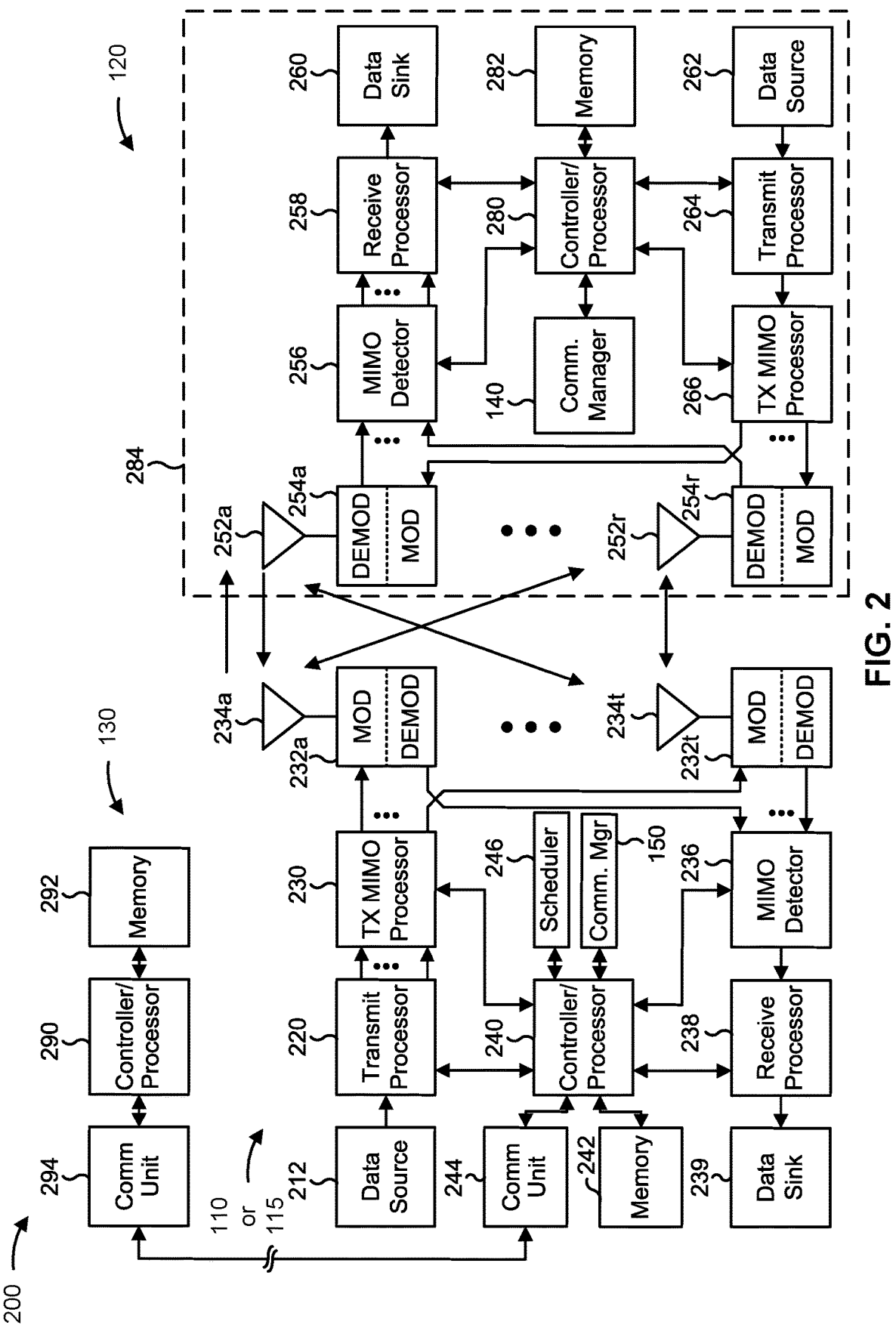
FIG. 2 is a diagram illustrating an example of a network node in communication with a user equipment (UE) in a wireless network, in accordance with the present disclosure.

FIG. 2 is a diagram illustrating an example 200 of a network node 110 or core network node 115 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein. As the network node 110 may include a core network node, the core network node 115 may include components described for the network node 110.

The controller/processor of a network entity (e.g., the controller/processor 240 of the network node 110), the controller/processor 280 of the UE 120, and/or any other component(s) of FIG. 2 may perform one or more techniques associated with configuring pre-paging, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a first network entity (e.g., a network node 110, core network node 115) includes means for establishing a first UE ID associated with pre-paging; and/or means for transmitting, with information associated with the first UE ID, a request associated with paging to a second network entity. In some aspects, the means for the first network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the first network entity includes means for receiving a pre-paging configuration with a first UE ID; means for generating a mapping between the pre-paging configuration and a second UE ID associated with the first UE ID; and/or means for transmitting a request associated with paging with the second UE ID and the pre-paging configuration.

In some aspects, a UE (e.g., a UE 120) includes means for establishing a first UE ID associated with pre-paging; and/or means for monitoring for the first UE ID in a pre-paging message. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second network entity (e.g., a network node 110) includes means for receiving, with information associated with a first UE ID, a request associated with paging from a first network entity; and/or means for transmitting a pre-paging message to a UE associated with the first UE ID. In some aspects, the means for the second network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
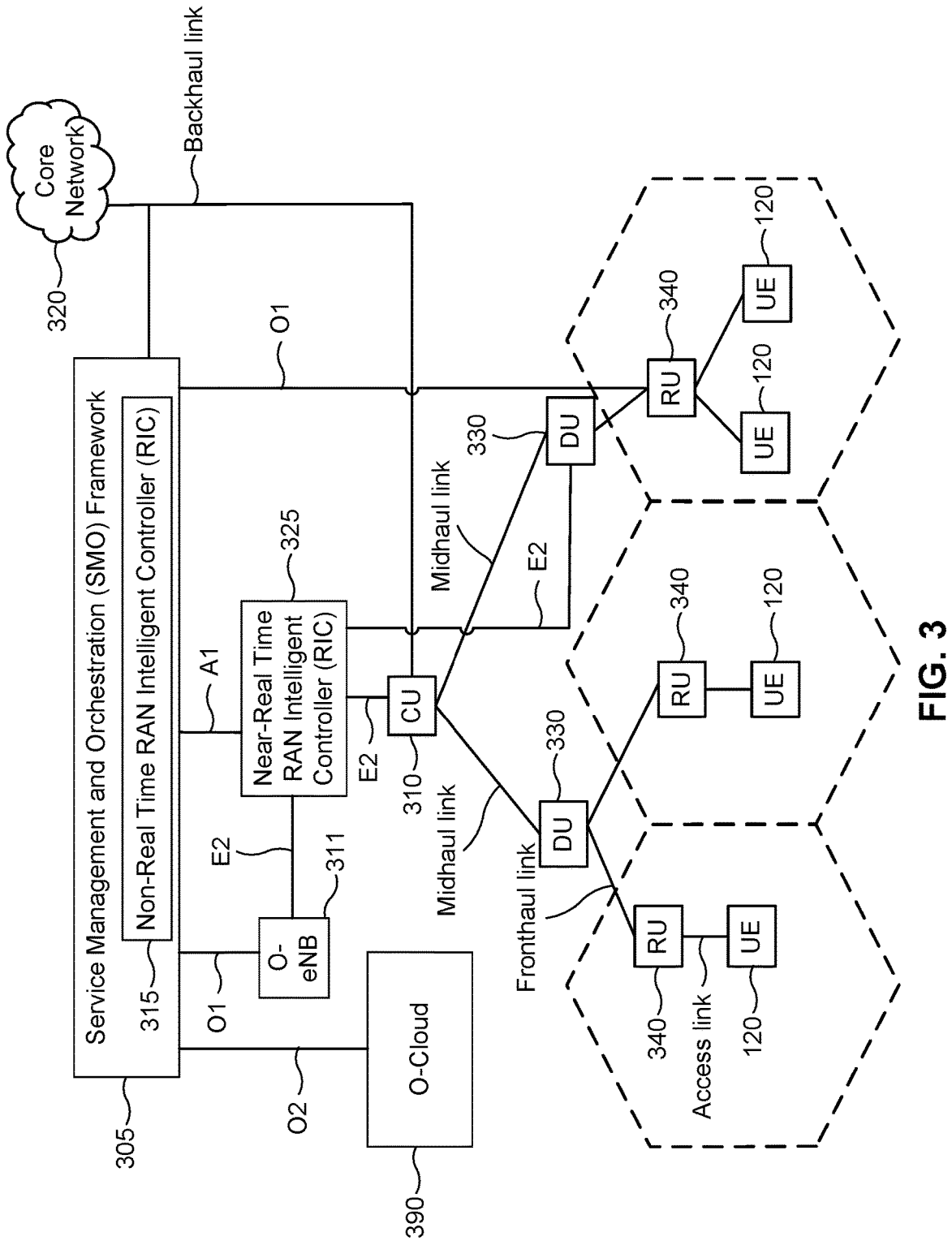
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, May include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
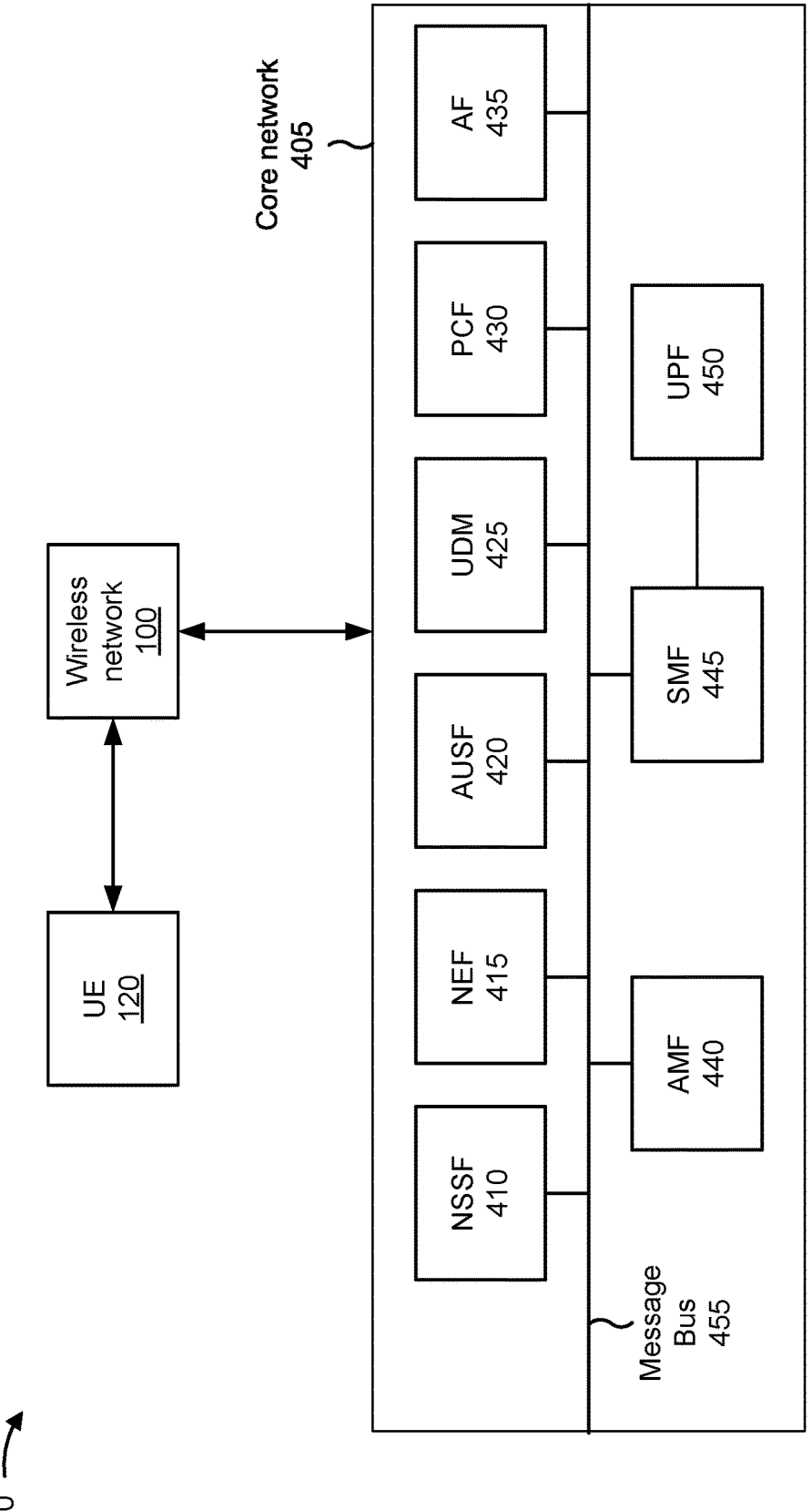
FIG. 4 is a diagram of an example of a core network, in accordance with the present disclosure.

FIG. 4 is a diagram of an example 400 of a core network 405, in accordance with the present disclosure. As shown in FIG. 4, example 400 may include a UE 120, a wireless network 100, and a core network 405. Devices and/or networks of example 400 may interconnect via wired connections, wireless connections, or a combination thereof.

The wireless network 100 may support, for example, a cellular RAT. The network 100 may include one or more network nodes, such as base stations (e.g., base transceiver stations, radio base stations, node Bs, eNodeBs (eNBs), gNodeBs (gNBs), base station subsystems, cellular sites, cellular towers, access points, TRPs, radio access nodes, macrocell base stations, microcell base stations, picocell base stations, femtocell base stations, or similar types of devices) and other network nodes that can support wireless communication for the UE 120. The network 100 may transfer traffic between the UE 120 (e.g., using a cellular RAT), one or more network nodes (e.g., using a wireless interface or a backhaul interface, such as a wired backhaul interface), and/or the core network 405. The wireless network 100 may provide one or more cells that cover geographic areas.

In some aspects, the wireless network 100 may perform scheduling and/or resource management for the UE 120 covered by the network 100 (e.g., the UE 120 covered by a cell provided by the wireless communication network 100). In some aspects, the wireless network 100 may be controlled or coordinated by a network controller (e.g., network controller 130 of FIG. 1), which may perform load balancing and/or network-level configuration, among other examples. As described above in connection with FIG. 1, the network controller may communicate with the network 100 via a wireless or wireline backhaul. In some aspects, the wireless network 100 may include a network controller, a self-organizing network (SON) module or component, or a similar module or component. Accordingly, the wireless network 100 may perform network control, scheduling, and/or network management functions (e.g., for uplink, downlink, and/or sidelink communications of the UE 120 covered by the network 100).

In some aspects, the core network 405 may include an example functional architecture in which systems and/or methods described herein may be implemented. For example, the core network 405 may include an example architecture of a 5G next generation (NG) core network included in a 5G wireless telecommunications system. Although the example architecture of the core network 405 shown in FIG. 4 may be an example of a service-based architecture, in some aspects, the core network 405 may be implemented as a reference-point architecture and/or a 4G core network, among other examples.

As shown in FIG. 4, the core network 405 may include a number of functional elements. The functional elements may include, for example, a network slice selection function (NSSF) 410, a network exposure function (NEF) 415, an authentication server function (AUSF) 420, a unified data management (UDM) component 425, a policy control function (PCF) 430, an application function (AF) 435, an AMF 440, a session management function (SMF) 445, and/or a user plane function (UPF) 450, among other examples. These functional elements may be communicatively connected via a message bus 455. Each of the functional elements shown in FIG. 4 may be implemented on one or more devices associated with a wireless telecommunications system. In some implementations, one or more of the functional elements may be implemented on physical devices, such as an access point, a base station, and/or a gateway, among other examples. In some implementations, one or more of the functional elements may be implemented on a computing device of a cloud computing environment.

The NSSF 410 may include one or more devices that select network slice instances for the UE 120. Network slicing is a network architecture model in which logically distinct network slices operate using common network infrastructure. For example, several network slices may operate as isolated end-to-end networks customized to satisfy different target service standards for different types of applications executed, at least in part, by the UE 120 and/or communications to and from the UE 120. Network slicing may efficiently provide communications for different types of services with different service standards.

The NSSF 410 may determine a set of network slice policies to be applied at the wireless network 100. For example, the NSSF 410 may apply one or more UE route selection policy (URSP) rules. In some aspects, the NSSF 410 may select a network slice based on a mapping of a data network name (DNN) field included in a route selection description (RSD) to the DNN field included in a traffic descriptor selected by the UE 120. By providing network slicing, the NSSF 410 allows an operator to deploy multiple substantially independent end-to-end networks potentially with the same infrastructure. In some implementations, each slice may be customized for different services.

The NEF 415 may include one or more devices that support exposure of capabilities and/or events in the wireless telecommunications system to help other entities in the wireless telecommunications system discover network services. The AUSF 420 may include one or more devices that act as an authentication server and support the process of authenticating the UE 120 in the wireless telecommunications system.

The UDM 425 may include one or more devices that store user data and profiles in the wireless telecommunications system. In some aspects, the UDM 425 may be used for fixed access and/or mobile access, among other examples, in the core network 405.

The PCF 430 may include one or more devices that provide a policy framework that incorporates network slicing, roaming, packet processing, and/or mobility management, among other examples. In some aspects, the PCF 430 may include one or more URSP rules used by the NSSF 410 to select network slice instances for the UE 120.

The AF 435 may include one or more devices that support application influence on traffic routing, access to the NEF 415, and/or policy control, among other examples. The AMF 440 may include one or more devices that act as a termination point for non-access stratum (NAS) signaling and/or mobility management, among other examples. In some aspects, the AMF 440 may request the NSSF 410 to select network slice instances for the UE 120, e.g., at least partially in response to a request for data service from the UE 120.

The SMF 445 may include one or more devices that support the establishment, modification, and release of communication sessions in the wireless telecommunications system. For example, the SMF 445 may configure traffic steering policies at the UPF 450 and/or enforce user equipment internet protocol (IP) address allocation and policies, among other examples. In some aspects, the SMF 445 may provision the network slice instances selected by the NSSF 410 for the UE 120.

The UPF 450 may include one or more devices that serve as an anchor point for intraRAT and/or interRAT mobility. In some aspects, the UPF 450 may apply rules to packets, such as rules pertaining to packet routing, traffic reporting, and/or handling user plane QoS, among other examples.

The message bus 455 may be a logical and/or physical communication structure for communication among the functional elements. Accordingly, the message bus 455 may permit communication between two or more functional elements, whether logically (e.g., using one or more application programming interfaces (APIs), among other examples) and/or physically (e.g., using one or more wired and/or wireless connections).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example 400 may perform one or more functions described as being performed by another set of devices of example environment 400.

As indicated above, FIG. 4 is provided as an example. Other examples may differ from what is described with regard to FIG. 4.

Figure 5:
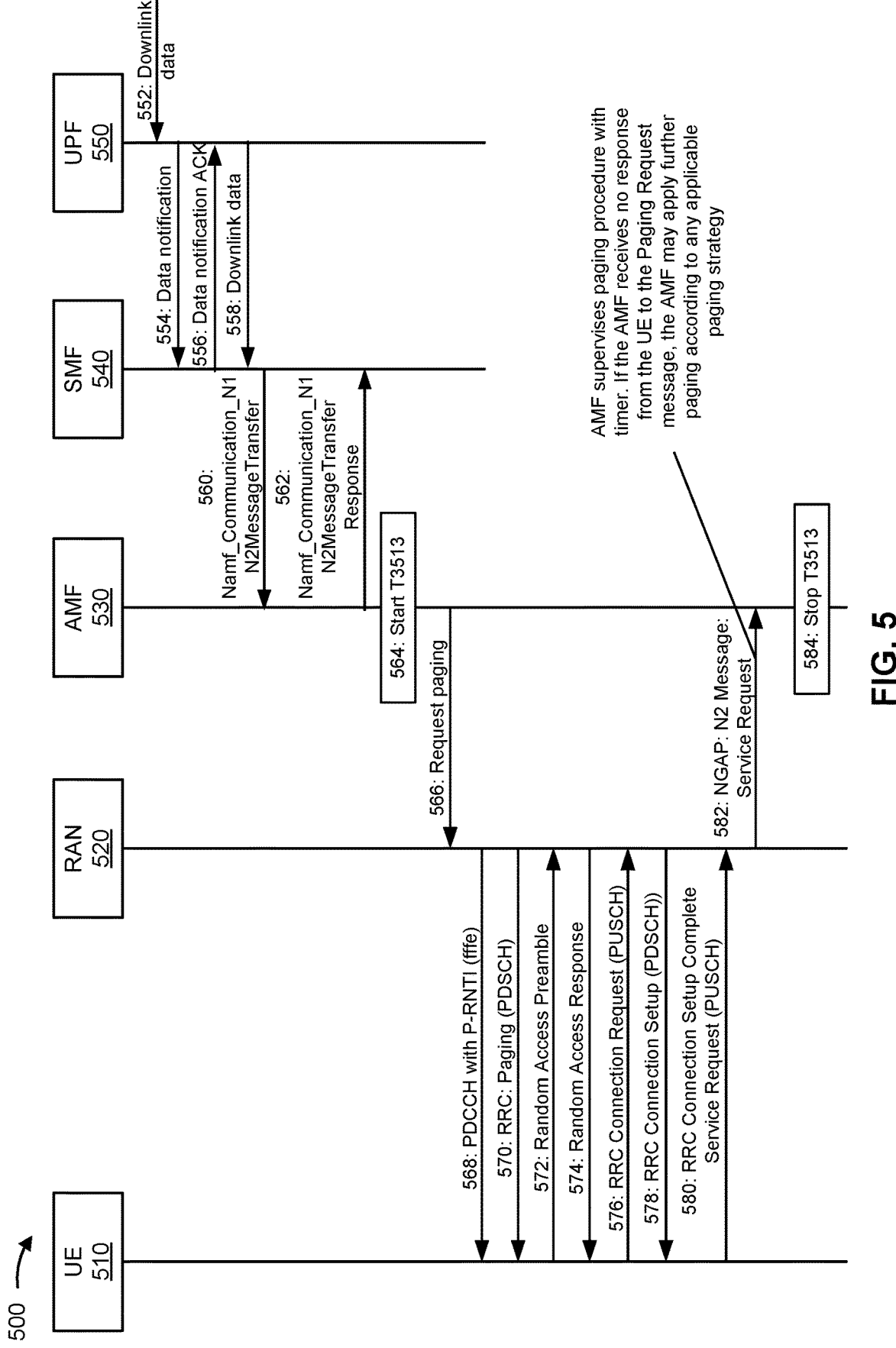
FIG. 5 is a diagram illustrating an example associated with a paging signal flow, in accordance with the present disclosure.

FIG. 5 is a diagram illustrating an example 500 associated with a paging signal flow, in accordance with the present disclosure. As shown in FIG. 5, a UE 510 (e.g., UE 120) and a network node at a RAN 520 (e.g., network node 110) may communicate with one another in a wireless network (e.g., wireless network 100). The RAN 520 may communicate with an AMF 530 (e.g., AMF 440). The AMF 530 may communicate with an SMF 540 (e.g., SMF 445). The SMF 540 may communicate with a UPF 550 (e.g., UPF 450).

A core network may control the paging of a UE by a RAN. For example, the AMF of the core network may request paging by the RAN. For example, an access and AMF of the core network may request paging by the RAN. A network node of the RAN may then page the UE to indicate that the UE can set up a connection. More specifically, the network node may transmit a PDCCH message that uses a P-RNTI and that allocates resources for a paging message. The network node may transmit the paging message on a PDSCH in the allocated resource. The UE may set up a connection with the network node (including a bearer) based on receiving the paging message and performing a RACH procedure.

Example 500 shows paging signaling that is initiated by the core network. As shown by reference number 552, the UPF 550 may receive downlink data. As shown by reference number 554, the UPF 550 may notify the SMF 540 of the data. As shown by reference number 556, the SMF 540 may provide an acknowledgment (ACK) of the data notification. As shown by reference number 558, the UPF 550 may transmit the downlink data to the SMF 540.

As shown by reference number 560, the SMF 540 may initiate a Namf communication N1 and N2 message transfer. The message transfer helps to identify a service-based interface for the AMF 530. The message transfer may include details, such as a packet data protocol (PDU) session ID, N2 session management information (e.g., quality of service (QOS) profiles), core network N3 tunnel information, a single network slice selection assistance information (S-NSSAI) that identifies a slice, and a paging policy indicator that is used for identifying paging policies. As shown by reference number 562, the AMF 530 may provide a message transfer response. As shown by reference number 564, the AMF 530 may start a timer (e.g., T3513). Timer T3513 starts when a paging procedure is initiated and stops when the paging procedure ends (with the reception of a paging response). As shown by reference number 566, the AMF 530 may transit a paging request to the RAN 520 (RAN 520 network entity).

As shown by reference number 568, the RAN 520 (network entity of the RAN 520) may transmit a PDCCH message with a paging radio network temporary identifier (P-RNTI) to the UE 510. The P-RNTI may have a fixed value of "fffe". As shown by reference number 570, the RAN 520 may transmit an RRC message for paging on the PDSCH. As shown by reference number 572, the UE 510 may transmit a random access (RA) preamble to the RAN 520 to initiate a RACH procedure for establishing a connection. as shown by reference number 574, the RAN 520 may transmit a random access response as part of the RACH procedure. As shown by reference number 576, the UE 510 may transmit an RRC connection request on the PUSCH to establish a connection. as shown by reference number 578, the RAN 520 may transmit an RRC connection setup message on the PDSCH. As shown by reference number 580, the UE 510 may transmit an RRC connection setup complete service request message on the PUSCH.

As shown by reference number 582, the RAN 520 may transmit a next generation application protocol (NGAP) N2 message that indicates a service request for a connection. The AMF 530 may be supervising the paging procedure with the timer. If the AMF receives no response from the UE 510 to the paging request, the AMF 530 may apply further paging according to an applicable paging strategy. The AMF 530 may be counting paging requests while the timer is running. As shown by reference number 584, the AMF 530 may stop the timer.

While this paging procedure may be successful when the UE 510 is in regular coverage of the RAN 520, in some scenarios, the UE 510 may not be able to monitor paging if the UE 510 moves into deep coverage or further away from the RAN 520 where coverage is less reliable. For example, if the UE 510 has moved into less reliable coverage, there may be no steps 570 through 580.

Only upon successful completion of bearer setup does the user interface of the UE 510 notify the user about an incoming call (via ringing, vibration, notification). This may not be satisfactory for mobile termination (MT) calls or sessions because, if paging and RACH is successful, but a subsequent PUSCH message fails. Even if paging is successful, assuming a downlink link budget is sufficient (not too much power loss on the link), the RACH will fail due to a weak uplink. In addition, the paging message may not be received if the link is weak (e.g., if the smartphone is in a pocket or in a backpack).

To address these issues, in some examples, the RAN 520 may perform pre-paging, in which the RAN 520 transmits a pre-paging message. This pre-paging message may include information identifying a UE and indicating that the UE is to connect to the RAN 520 and/or perform an action in preparation for paging. For example, the pre-paging message may enable the UE 520, which may have an insufficient link budget, to alert the user on a display interface of the UE 520 to move the UE 520 to a better location, to improve a link to the RAN 520. The RAN 520 may repeat the paging after a period of time. For example, in some aspects, rather than simply determining that paging has failed if no response to the paging is received from the UE, the RAN 520 may transmit a pre-paging message to the UE 520 on a pre-paging channel. Pre-paging may include transmitting a pre-paging message ahead of a paging message or in preparation for paging. The UE 520 may receive the pre-paging message and alert the user of the UE 520 to move to a better location. The RAN network entity may repeat the paging after a specified amount of time or expect another monitoring occasion (MO) session for paging. By using a pre-paging message, the paging may ultimately be successful.

In some examples, the UE 510 may indicate its capability to monitor pre-paging messages. The UE 510 may also indicate to the RAN 520 whether a pre-paging feature is turned on or off. The UE 510 may operate in a power-saving mode and may turn off the pre-paging feature. During any phase of an RRC-connected state, the RAN 520 may assign a temporary UE ID (e.g., temporary RNTI) for monitoring pre-paging PDCCH. In some aspects, the RAN 520 may use a new downlink control information (DCI) format reserved for pre-paging, which is scrambled by the RNTI. There may be a validity timer associated with the RNTI. The RAN 520 may clear the RNTI after the validity timer expires.

In some examples, there may by different ways of separating pre-paging resources, including ways of achieving time, frequency, and code domain orthogonality. For instance, pre-paging time and frequency resources may be group common, and UEs may be separated into multiple groups. The RAN 520 may signal each UE with a group ID and a unique RNTI (code). Each group may have non-overlapping time and frequency resources allocated for pre-paging.

In some examples, to enable the pre-paging configuration to be valid after cell reselection, the RAN 520 may configure a UE with pre-paging resources for a group of cells. If one of these cells is detected by the UE, the UE may be able to monitor pre-paging with the code assigned to the UE. The code assigned to the UE may be associated with the UE context.

The UE context may include information for a logical connection of the UE. The information may include a subscriber identify, an indication of whether the subscriber identity is unauthenticated, a 3GPP subscription identity, a globally unique temporary identifier, a mobile equipment identity, UE-specific discontinuous reception (DRX) parameters, mobility management network capabilities, event subscriptions, and/or other UE capabilities related to the 5G core network. The UE context may be maintained by the AMF 530.

However, in one scenario, the paging UE ID that is used for paging (e.g., 5G S-TMSI) is 48 bits and may be too long in length for use on a pre-paging channel that the UE 510 is to monitor for pre-paging. In another scenario, since the RAN 520 clears the UE context after the UE 510 moves to an RRC idle state, the RAN 520 may not be able to use a paging UE ID at a future time since the paging UE ID may correspond to the UE context at the RAN 520, which is cleared once the UE 510 moves to an RRC idle state. For example, the UE 510 may receive a signal but not respond to paging. Furthermore, since the RAN 520 clears the UE context, the RAN 520 may not be able to store the code or temporary UE ID assigned to the UE 510 for pre-paging monitoring. Without a pre-paging configuration stored information for the pre-paging resources, the RAN 520 may have to allocate pre-paging resources and assign a code to the UE 510 again when the UE 510 is to be paged. This increases latency and consumes signaling resources. That is, if the pre-paging resources are allocated by the RAN 520 during an RRC connected mode, this information needs to be stored at the core network since the UE context in RAN 520 is cleared once the UE 510 moves to an RRC idle state. Thereby, this information is lost for a future paging/pre-paging occasion.

As indicated above, FIG. 5 is provided as an example. Other examples may differ from what is described with respect to FIG. 5.

According to various aspects described herein, the AMF may establish a new UE ID, such as a pre-paging UE ID for monitoring pre-paging. The AMF and the UE may establish (e.g., agree to) the pre-paging UE ID, which may be derived from a paging UE ID (e.g., 5G S-TMSI). The pre-paging UE ID may be shorter in length than a paging UE ID. The paging UE ID may be too long in length for use in a pre-paging message and/or on a pre-paging channel and the pre-paging UE ID may be short enough in length to be used in a pre-paging message and/or on a pre-paging channel. The AMF may request that the RAN network entity pre-page the UE with the pre-paging UE ID. The RAN network entity may transmit a pre-paging message with the pre-paging UE ID to the UE. The UE may respond to the pre-paging message based at least in part on the pre-paging UE ID. In some aspects, the UE may derive the pre-paging UE ID with information included in a paging message. In this way, a UE may respond to a pre-paging message even if the UE is not in good coverage. The network may avoid having to resend a pre-paging resource allocation for the UE. As a result, pre-paging may be successful. Also, latency may be reduced and signaling resources may be conserved because paging messages are not wasted.

Figure 6A:
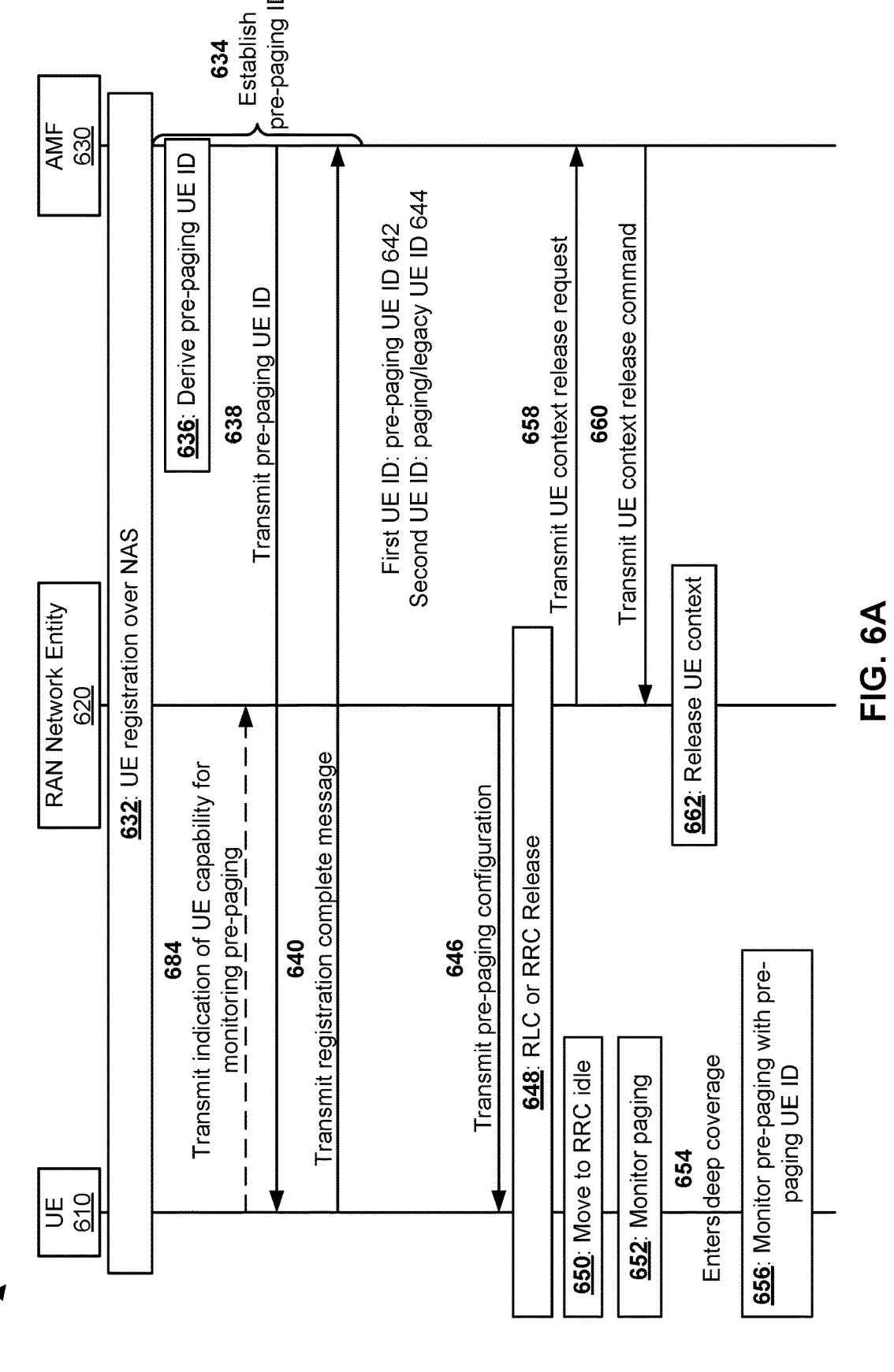
FIG. 6A and FIG. 6B are diagrams illustrating an example of configuring pre-paging, in accordance with the present disclosure.
Figure 6B:
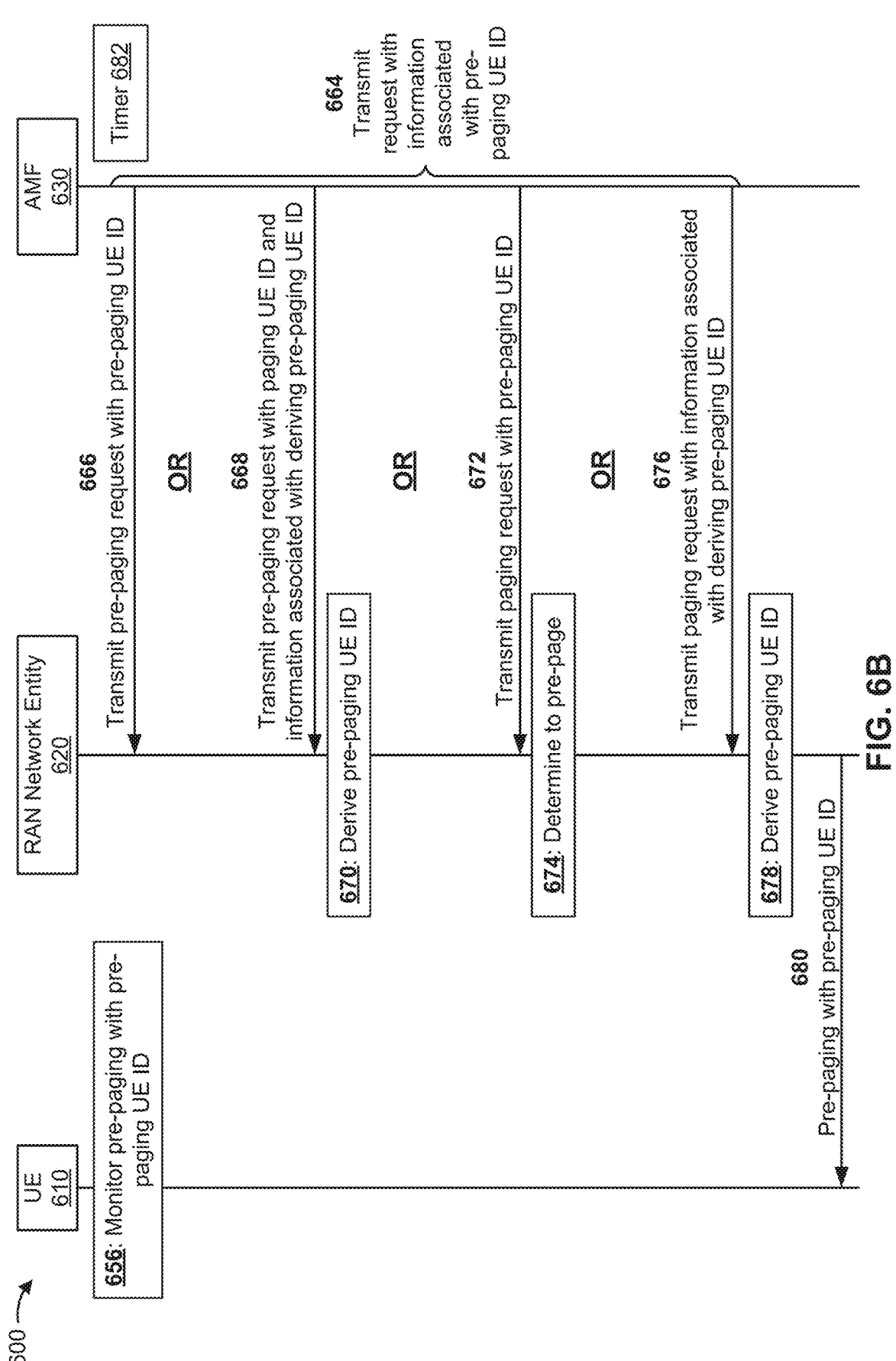

FIG. 6A and FIG. 6B are diagrams illustrating an example 600 of configuring pre-paging, in accordance with the present disclosure. Example 600 shows a UE 610 (e.g., UE 120) and a RAN network entity 620 (e.g., network node 110, referred to as "RAN 620") that may communicate with one another in a wireless network (e.g., wireless network 100). The RAN 620 may communicate with AMF 630 (e.g., AMF 440), which is located in a 5G core network (e.g., core network 405).

As shown by reference number 632 in FIG. 6A, the UE 610 may be registered with the AMF 630 over a NAS layer, which is a functional layer between the UE 610 and the core network. The UE 610 and the AMF 630 may establish a first UE ID, or a pre-paging UE ID used for monitoring pre-paging. As shown by reference number 634, the UE 610 and the AMF 630 may establish the pre-paging UE ID. As shown by reference number 636, the AMF 630 may derive the pre-paging UE ID from a second UE ID (e.g., 5G S-TMSI) or from geographical area information of a UE, a bit map, a masking function, a preconfigured function (e.g., configured by the network), or a predefined function (e.g., defined in a standard). A bitmap may include a second set of bits that are translated from a first set of bits for a UE ID. A mask may include a subset of the bits used for a UE ID. A function may include the addition of information, such as location information or an area code. For example, the pre-paging ID may include the X most significant bits of the 5G-S-TMSI plus an area code. The second UE ID may be a code that is shorter in length than the 5G S-TMSI. As part of establishing the pre-paging ID, as shown by reference number 638, the AMF 630 may transmit the pre-paging UE ID to the UE 610. The UE 610 may store the pre-paging UE ID for later pre-paging monitoring. As shown by reference number 640, the UE 610 may transmit a registration complete message. The registration complete message may indicate that the UE 610 has accepted the pre-paging UE ID. In some aspects, the UE 610 may derive the pre-paging UE ID from the second UE ID (e.g., 5G S-TMSI) or from geographical area information of a UE, a bit map, a masking function, a preconfigured function (e.g., configured by the network), or a predefined function (e.g., defined in a standard).

The AMF 630 and the UE 610 may now be familiar with at least two UE IDs. A first UE ID may be the pre-paging UE ID 642 that is associated with pre-paging or specific to pre-paging (used for pre-paging and not paging). A first UE ID associated with pre-paging may mean that the first UE ID is the pre-paging UE ID, is to be used for pre-paging, or corresponds to pre-paging. The first UE ID may be a UE ID that is used for enhanced paging or paging for coverage enhancements. A second UE ID may be an original or legacy UE ID 644, such as the 5G-TMSI. The UE 610 and the AMF 630 may establish the paging UE ID at UE registration. This may include the UE 610 sharing its paging UE ID or the AMF 630 assigning the paging UE ID. The paging UE ID (second UE ID) may be what has typically been transmitted with a paging request from the AMF 630. A paging request may include a request for paging or a request that initiates paging. However, in example 600, the pre-paging UE ID (first UE ID) may be what is transmitted in a pre-paging request. A pre-paging request may include a request for pre-paging or a request that initiates pre-paging.

As shown by reference number 646, the RAN 620 may transmit a pre-paging configuration. The pre-paging configuration may include information for monitoring pre-paging and for receiving pre-paging messages. The pre-paging configuration may indicate time domain resources, frequency domain resources, and/or code domain resources for monitoring pre-paging. The pre-paging configuration may include a a temporary UE ID (e.g., RNTI) or other information associated with scrambling a pre-paging message.

In some cases, the UE 610 may change state or move to less reliable coverage. As shown by reference number 648, there may be an RLC or RRC release, which may result from a loss or ending of an RRC connected state. As shown by reference number 650, the UE 610 may move to an RRC idle state. As shown by reference number 652, the UE 610 may start monitoring for paging messages. As shown by reference number 654, the UE 610 may move into deep coverage, which may include less reliable coverage. The location of the UE 610 may cause paging signaling to be unsuccessful. As shown by reference number 656, the UE 610 may monitor for pre-paging messages that include the pre-paging ID. The pre-paging messages may be on a pre-paging channel and/or may be shorter messages such that the UE 610 may be more likely to receive and respond to a pre-paging message than a paging message.

Meanwhile, the UE context may be released. As shown by reference number 658, the RAN 620 may transit a UE context release request. As shown by reference number 660, the AMF 630 may transmit a UE context release command. As shown by reference number 662, the UE context may be released at the RAN 620.

Example 600 continues from FIG. 6A to FIG. 6B, where the UE 610 is monitoring for pre-paging messages that include the pre-paging UE ID, as shown by reference number 656. The UE 610 may monitor a pre-paging channel that is the same or different than a paging channel. As shown by reference number 664, the AMF 630 may transmit a request with information associated with the pre-paging ID. The information associated with the pre-paging UE ID may include the pre-paging UE ID, the paging UE ID, and/or information used to derive the pre-paging UE ID. Information used to derive the pre-paging UE ID may include a 5G S-TMSI (which may be the paging UE ID), geographical area information of a UE, a bit map, a masking function, a preconfigured function, or a predefined function.

The request with information associated with the pre-paging UE ID may include one of at least four options for initiating pre-paging. Pre-paging may be initiated with a pre-paging request by the AMF 630 or with a paging request by the AMF 630. If the AMF 630 transmits a paging request, it may be up to the RAN 620 to determine whether to perform pre-paging rather than paging. In some aspects (option 1), as shown by reference number 666, the AMF 630 may transmit a pre-paging request with the pre-paging UE ID.

In some aspects (option 2), as shown by reference number 668, the AMF 630 may transmit a pre-paging request with the paging UE ID and information associated with deriving the pre-paging UE ID. As shown by reference number 670, the RAN 620 may derive the pre-paging UE ID from the information associated with deriving the pre-paging UE ID.

In some aspects (option 3), as shown by reference number 672, the AMF 630 may transmit a paging request with the pre-paging UE ID. As shown by reference number 674, the UE may determine to pre-page based at least in part on receiving the pre-paging UE ID with the regular paging request.

In some aspects (option 4), as shown by reference number 676, the AMF may transmit a paging request with information associated with deriving the pre-paging UE ID. As shown by reference number 678, the RAN 620 may derive the pre-paging UE ID from the information. In option 3 or 4, the paging request may include (or the information may include) an indication (e.g., flag) that the paging request is meant to be a pre-paging request.

As shown by reference number 680, the RAN 620 may pre-page with the pre-paging UE ID. This may include transmitting a pre-paging message including the pre-paging UE ID on a pre-paging channel. The UE 610, which is monitoring for a pre-paging message with the pre-paging UE ID, may detect that the pre-paging message is for the UE 610. In some aspects, the pre-paging UE ID may be a code that is used to encode pre-paging resources (e.g., scrambling the DCI cyclic redundancy check (CRC) bits) instead of including the code in the paging PDSCH, as in the legacy operation.

In some aspects, the UE 610 may respond to the pre-paging message. The UE 610 may respond by alerting the user to move to better coverage, transmitting a response message, awaiting a paging message, or transmitting an RA preamble message.

In some aspects, the pre-paging UE ID may be or may include a geographic location-specific ID. The pre-paging UE ID may be valid in only certain geographic locations, such as in certain countries. The pre-paging UE ID will not work (UE will not respond) in invalid geographical locations (e.g., not registered in a country).

In some aspects, the AMF 630 may use a timer 682 that is associated with a pre-paging request. For example, in some aspects, the AMF 630 may first request paging in the legacy manner and start the timer 682 (e.g., timer T3513). The timer 682 may expire and the AMF 630 may transmit the pre-paging request based at least in part on the expiration of the timer 682.

In some aspects, the timer 682 may be a pre-paging timer. The AMF 630 may start the timer 682 when the request is transmitted. When the timer 682 expires, the AMF 630 may transmit a new request. The AMF 630 may refrain from transmitting a request during the timer 682. In some aspects, the AMF 630 may abandon paging for a while if the timer 682 expires. The AMF 630 may stop the timer 682 if a response to the request is received.

In some aspects, as shown by reference number 684 in FIG. 6A, the UE 610 may transmit an indication of a UE capability to monitor pre-paging. For example, a UE paging information field may include a new flag for pre-paging. The AMF 630 may establish a pre-paging UE ID and transmit a pre-paging request based at least in part on the UE 610 having a UE capability to monitor pre-paging.

By establishing and using a pre-paging UE ID for the UE 610, the AMF 630 may help the UE 610 to detect a pre-paging message without additional operations or resource allocations for pre-paging. This reduces latency and conserves signaling resources.

As indicated above, FIG. 6A and FIG. 6B are provided as an example. Other examples may differ from what is described with regard to FIG. 6A and FIG. 6B.

Figure 7:
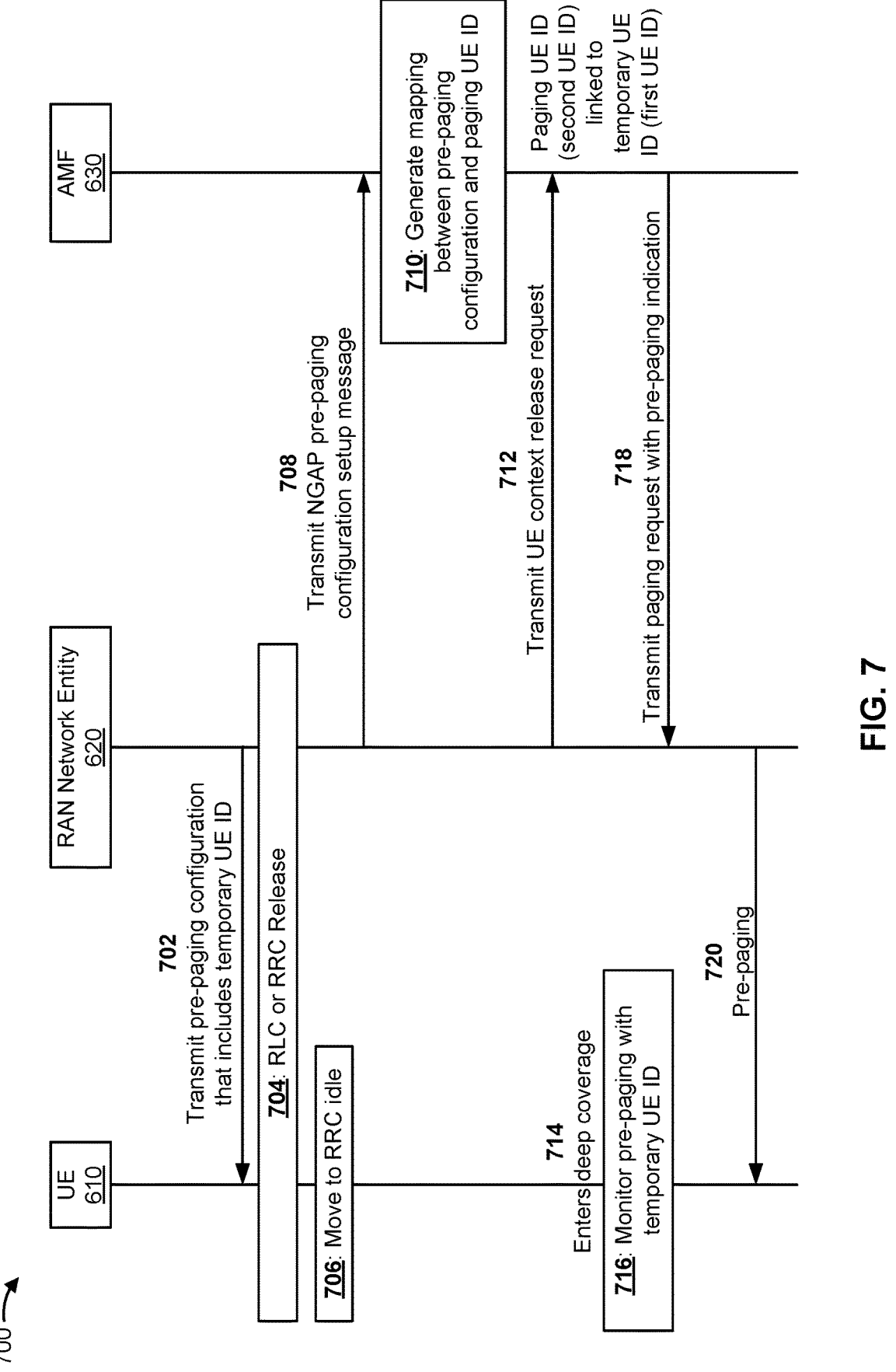
FIG. 7 is a diagram illustrating an example of configuring pre-paging, in accordance with the present disclosure.

FIG. 7 is a diagram illustrating an example 700 of configuring pre-paging, in accordance with the present disclosure.

In some aspects, the AMF may store UE-specific pre-paging resources (e.g., code or temporary UE ID, such as an RNTI) assigned to the UE for pre-paging resource monitoring across multiple cells/group IDs and codes). For example, the AMF may maintain a database of the codes or temporary UE IDs assigned to a UE. In some aspects, the AMF may generate a mapping between a pre-paging configuration (e.g., including an assigned code or temporary UE ID) and a UE paging identity for the UE (paging UE ID). The AMF may transmit a paging request with the pre-paging configuration and the paging UE ID to a RAN network entity. The RAN network entity may pre-page using the pre-paging configuration (with the temporary UE ID). The UE may monitor for pre-paging with the temporary UE ID and receive the pre-paging message. In this way, the AMF may indicate the code or temporary UE ID assigned to the UE (in the pre-paging configuration) when the AMF transmits the paging request to the RAN network entity. By maintaining a mapping assigned to the UE (e.g., in a database), the RAN network entity may avoid having to resend a pre-paging resource allocation. As a result, pre-paging will be successful. Latency may be reduced and signaling resources may be conserved if paging messages do not fail.

Example 700 shows an AMF that maintains a mapping of a pre-paging configuration to a UE for pre-paging. As shown by reference number 702, the RAN 620 may transmit a pre-paging configuration that includes a temporary UE ID (e.g., RNTI established by the RAN 620). The pre-paging configuration may include UE-specific pre-paging resources, such as a time domain resource, frequency domain resource, and/or a code domain resource. The code domain resource may include a code (e.g., the RNTI) assigned to the UE for pre-paging resource monitoring across multiple cells/group IDs and codes.

As shown by reference number 704, the UE 610 may encounter an RLC or RRC release. As shown by reference number 706, the UE 610 may move to an RRC idle state.

As shown by reference number 708, the RAN 620 may transmit an NGAP pre-paging configuration setup message. This message may be part of an NGAP procedure, which involves communications between the RAN 620 and the AMF 630 to support UEs. NGAP procedures may be applicable to both 3GPP access and non-3GPP access. The setup message may include the pre-paging configuration. The message may be indexed with the UE 610 over an NG interface. The AMF 630 may link the temporary UE ID to a permanent UE ID, such as the paging UE ID. This temporary UE ID may be referred to as a first UE ID. The paging UE ID may be referred to as a second UE ID. The second UE ID may be associated with the first UE ID. That is, the second UE ID may correspond to or may be linked to the first UE ID.

The AMF 630 may maintain a table of paging UE IDs and pre-paging configurations. The paging UE ID may be a more permanent UE ID. As shown by reference number 710, the AMF 630 and may generate a mapping between the paging UE ID (second UE ID) to one or more pre-paging configurations. A pre-paging configuration may indicate a time and frequency resource assignment for pre-paging and a temporary UE ID (first UE ID). The assignment and the temporary UE ID may only be valid for a certain amount of time. The assignment and the temporary UE ID may be associated with a setup time (when the temporary UE ID starts to be valid) and a validity duration (how long the temporary UE ID is valid). The AMF 630 may record the setup time and validity duration of the resource. After the validity duration, the AMF 630 may clear the temporary UE ID records.

For some reason, the UE context may be released. As shown by reference number 712, the RAN 620 may transmit a UE context release request. As shown by reference number 714, the UE 610 may enter deep coverage. As shown by reference number 716, the UE 610 may monitor for pre-paging with a UE ID (e.g., temporary UE ID or first UE ID). In some aspects, the UE 610 may monitor for pre-paging with a paging UE ID (second UE ID). In some aspects, the UE 610 may monitor for pre-paging with a pre-paging UE ID that is specific to pre-paging and that was established at or near the time of UE registrations. The UE 610 may monitor for pre-paging messages on a pre-paging channel.

The AMF 630 may transmit a request associated with paging. The request may be a paging request with the paging UE ID. In some aspects, the request may include a paging request and a pre-paging request. For example, as shown by reference number 718, the paging request may include a paging request with a pre-paging indication (e.g., pre-paging flag). The request may be an NGAP paging request message.

The RAN 620 may decide whether to use legacy paging or pre-paging to the UE 610. The RAN 620 may decide to perform pre-paging. As shown by reference number 720, the RAN 620 may begin pre-paging. The RAN may pre-page using the pre-paging configuration (with the temporary UE ID). This may include transmitting a pre-paging message with the temporary UE ID on a pre-paging channel. In some aspects, the pre-paging message may include the second UE ID (paging UE ID) or a pre-paging UE ID that was established between the UE 610 and the AMF 630.

By maintaining pre-paging configurations for UEs, the AMF 630 does not have to reallocate paging resources after a UE context is cleared. This helps pre-paging to be successful and may reduce latency and conserve signaling resources.

As indicated above, FIG. 7 is provided as an example. Other examples may differ from what is described with regard to FIG. 7.

Figure 8:
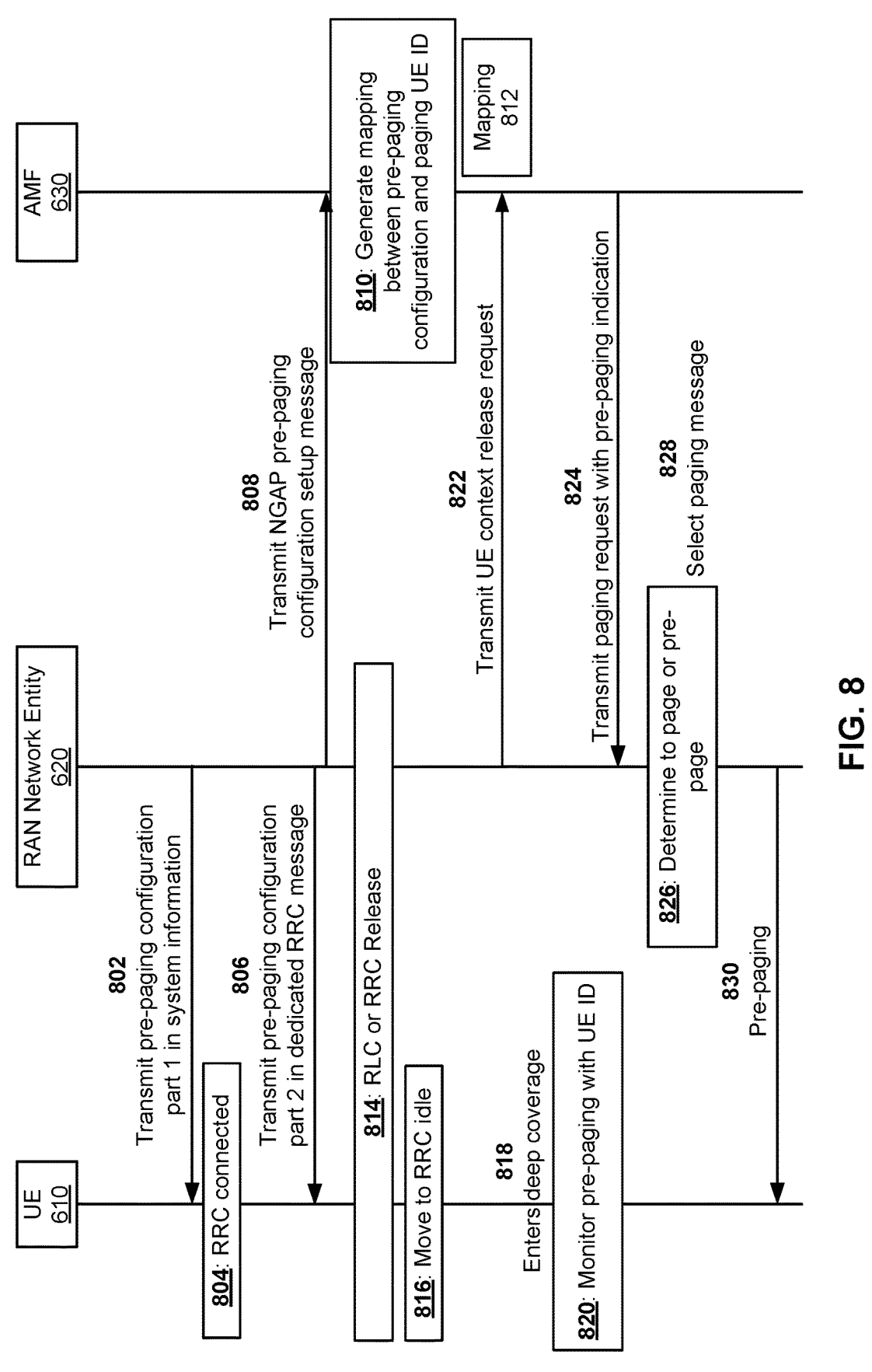
FIG. 8 is a diagram illustrating an example of configuring pre-paging, in accordance with the present disclosure.

FIG. 8 is a diagram illustrating an example 800 of configuring pre-paging, in accordance with the present disclosure.

In some aspects, RAN 620 may split the pre-paging configuration into two parts. There may be a cell-specific part (first part) and a dedicated/UE-specific part (second part). As shown by reference number 802, the RAN 620 may transmit the first part in system information (SI). As shown by reference number 804, the UE 610 may enter an RRC connected state. As shown by reference number 806, the RAN 620 may transmit the second part of the pre-paging configuration.

As shown by reference number 808, the RAN 620 may transmit a NGAP pre-paging configuration setup message. This message may be part of an NGAP procedure, which involves communications between the RAN 620 and the AMF 630 to support UEs. The setup message may include the pre-paging configuration. The message may be indexed with the UE 610 over an NG interface. The AMF may map a temporary UE ID in the pre-paging configuration to a permanent UE ID, such as the UE paging identity (e.g., paging UE ID).

The AMF 630 may maintain a table of paging UE IDs and pre-paging configurations. A paging UE ID may be a more permanent UE ID. As shown by reference number 810, the AMF 630 and may generate a mapping 812 between the paging UE ID (second UE ID) to one or more pre-paging configurations. The assignment and the temporary UE ID of the pre-paging configuration may only be valid for a certain amount of time. The assignment and the temporary UE ID may be associated with a setup time (when the temporary UE ID starts to be valid) and a validity duration (how long the temporary UE ID is valid). The AMF may record the setup time and validity duration of the resource. After the validity duration, the AMF may clear the temporary UE ID records.

As shown by reference number 814, the UE 610 may encounter an RLC or RRC release. As shown by reference number 816, the UE 610 may move to an RRC idle state. As shown by reference number 818, the UE 610 may enter deep coverage. As shown by reference number 820, the UE 610 may monitor for pre-paging with the temporary UE ID (first UE ID). In some aspects, the UE 610 may monitor for pre-paging with a paging UE ID (second UE ID). In some aspects, the UE 610 may monitor for pre-paging with a pre-paging UE ID that is specific to pre-paging and that was established at or near the time of UE registration. The UE 610 may monitor for pre-paging messages on a pre-paging channel. As shown by reference number 822, the RAN 620 may transmit a UE context release request.

The AMF 630 may transmit a request associated with paging. The request may include a paging request and a pre-paging request. For example, as shown by reference number 824, the paging request may include a paging request with a pre-paging indication (e.g., pre-paging flag).

As shown by reference number 826, the RAN 620 determine whether to use legacy paging or pre-paging to the UE 610. As shown by reference number 828, the RAN 620 may select the paging message, whether the paging message is a paging message or a pre-paging message. For example, the RAN 620 may decide to perform pre-paging (e.g., based on the pre-paging indication). The RAN 620 may select a pre-paging message. The RAN 620 may select a pre-paging message based at least in part on the pre-paging configuration. For example, the RAN 620 may select a pre-paging message that is appropriate for a resource allocation for the pre-paging message.

As shown by reference number 830, the RAN 620 may begin pre-paging. This may include transmitting a pre-paging message on a pre-paging channel. The pre-paging message may include the temporary UE ID, the paging UE ID, or a pre-paging UE ID.

By having the RAN 620 decide to pre-page or page, the RAN 620 may have more flexibility in contacting the UE 610. This reduces latency.

As indicated above, FIG. 8 is provided as an example. Other examples may differ from what is described with regard to FIG. 8.

Figure 9:
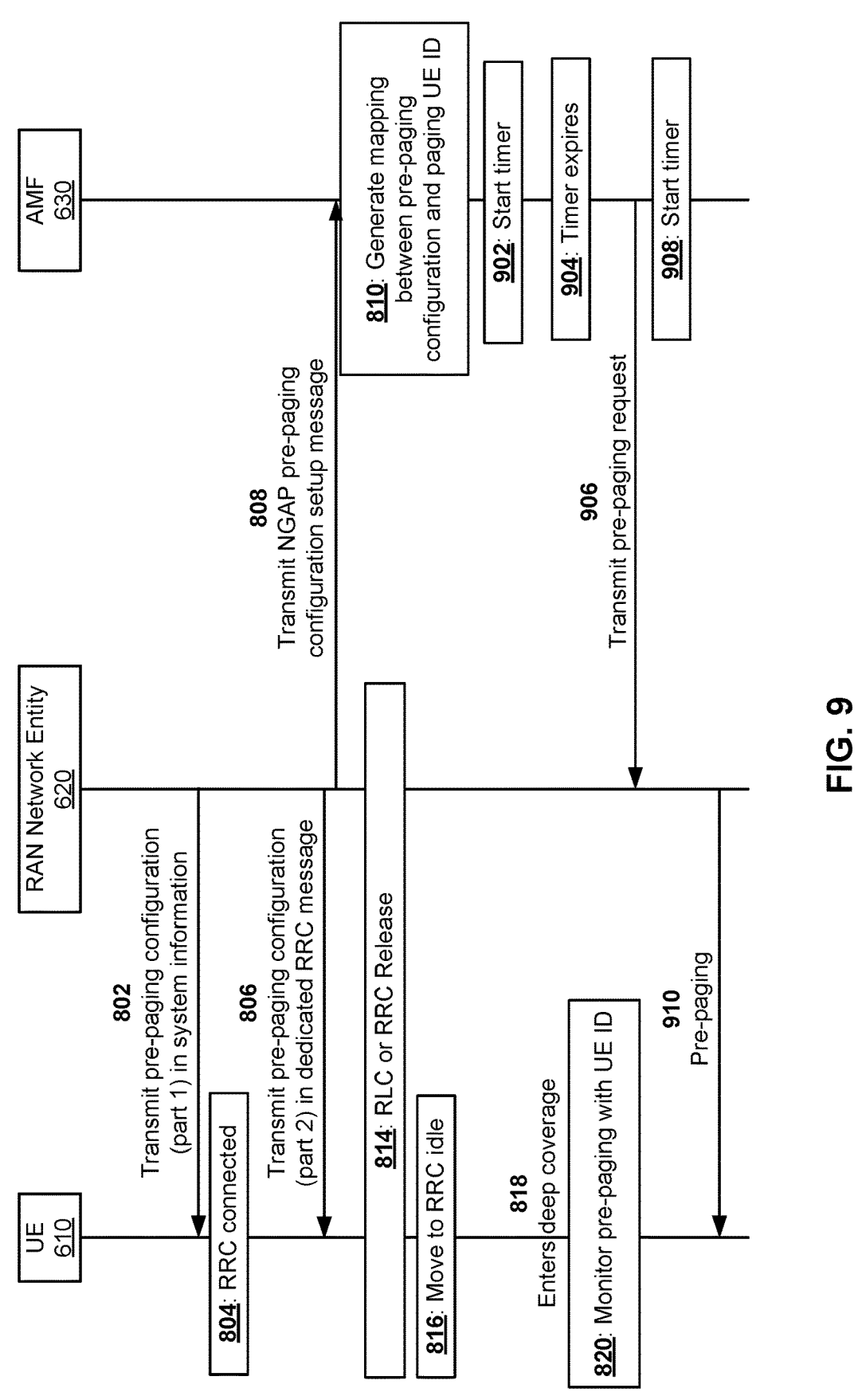
FIG. 9 is a diagram illustrating an example of configuring pre-paging, in accordance with the present disclosure.

FIG. 9 is a diagram illustrating an example 900 of configuring pre-paging, in accordance with the present disclosure. Example 900 is similar to example 800 up through reference number 820.

In some aspects, the AMF 630 may transmit a pre-paging request based at least in part on the expiration of a timer (e.g., timer T3513). For example, the AMF 630 may first request paging in the legacy manner. As shown by reference number 902, the AMF 630 may start the timer. As shown by reference number 904, the timer may expire. As shown by reference number 906, the AMF 630 may transmit a pre-paging request based at least in part on the expiration of the timer. The pre-paging request may include UE-specific resource information. As shown by reference number 908, the AMF 630 may start another timer (e.g., with a larger value). The RAN 620 may receive the request and pre-page the UE 610 on a pre-paging channel, as shown by reference number 910.

By transmitting a pre-paging request based at least in part on a timer expiration of a paging request, the AMF 630 may give paging a change before pre-paging, but will start pre-paging right away. This reduces latency.

As indicated above, FIG. 9 is provided as an example. Other examples may differ from what is described with regard to FIG. 9.

Figure 10:
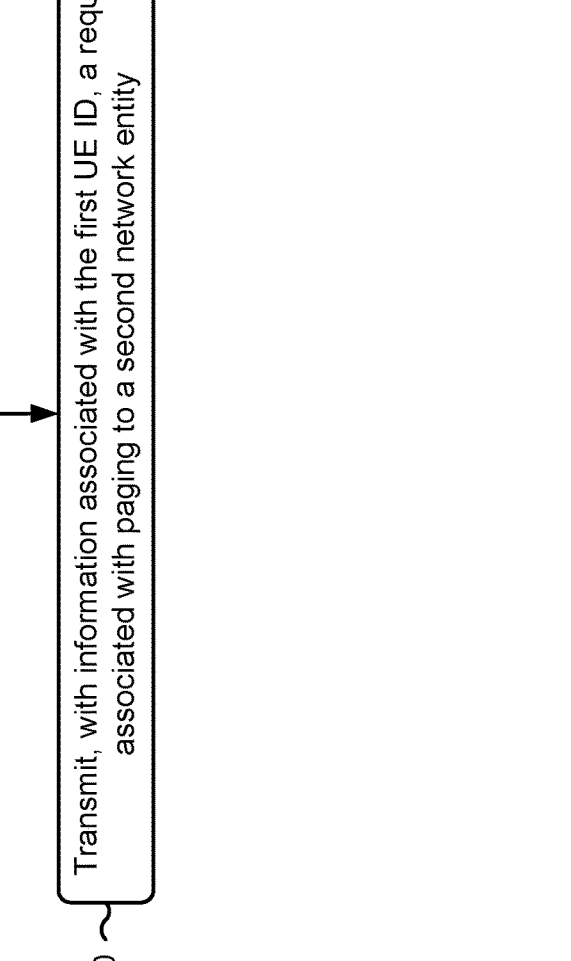
FIG. 10 is a diagram illustrating an example process performed, for example, at a first network entity or an apparatus of a first network entity, in accordance with the present disclosure.

FIG. 10 is a diagram illustrating an example process 1000 performed, for example, at a first network entity or an apparatus of a first network entity, in accordance with the present disclosure. Example process 1000 is an example where the apparatus or the first network entity (e.g., network node 110, core network node 115, AMF 630) performs operations associated with configuring pre-paging.

As shown in FIG. 10, in some aspects, process 1000 may include establishing a first UE ID associated with pre-paging (block 1010). For example, the first network entity (e.g., using communication manager 160 and/or pre-paging component 1408, depicted in FIG. 14) may establish a first UE ID associated with pre-paging, as described above.

As further shown in FIG. 10, in some aspects, process 1000 may include transmitting, with information associated with the first UE ID, a request associated with paging to a second network entity (block 1020). For example, the first network entity (e.g., using communication manager 160 and/or transmission component 1404, depicted in FIG. 14)

may transmit, with information associated with the first UE ID, a request associated with paging to a second network entity, as described above.

Process 1000 may include additional aspects, such as any single aspect or any combination of aspects described below and/or in connection with one or more other processes described elsewhere herein.

In a first aspect, establishing the first UE ID includes transmitting the first UE ID, and receiving a registration complete message.

In a second aspect, alone or in combination with the first aspect, transmitting the request includes transmitting the request in response to receiving a UE context release message.

In a third aspect, alone or in combination with one or more of the first and second aspects, the information associated with the first UE ID includes the first UE ID, and the request is a pre-paging request.

In a fourth aspect, alone or in combination with one or more of the first through third aspects, the information associated with the first UE ID includes a second UE ID and information associated with deriving the first UE ID, and the request is a pre-paging request.

In a fifth aspect, alone or in combination with one or more of the first through fourth aspects, the information associated with the first UE ID includes the first UE ID, and the request is a paging request.

In a sixth aspect, alone or in combination with one or more of the first through fifth aspects, the information associated with the first UE ID includes information associated with deriving the first UE ID, and the request is a paging request.

In a seventh aspect, alone or in combination with one or more of the first through sixth aspects, the information associated with deriving the first UE ID includes one or more of a second UE ID associated with the UE, a 5G S-TMSI, geographical area information of a UE, a bit map, a masking function, a preconfigured function, or a predefined function.

In an eighth aspect, alone or in combination with one or more of the first through seventh aspects, process 1000 includes deriving the first UE ID from one or more of a second UE ID associated with the UE (e.g., paging UE ID or other identity associated with paging), a 5G S-TMSI associated with a UE, geographical area information of a UE, a bit map, a masking function, a preconfigured function, or a predefined function.

In a ninth aspect, alone or in combination with one or more of the first through eighth aspects, the first UE ID is shorter in length than the 5G S-TMSI.

In a tenth aspect, alone or in combination with one or more of the first through ninth aspects, process 1000 includes maintaining a timer associated with pre-paging that starts based at least in part on the request, and transmitting a new request based at least in part on expiration of the timer.

In an eleventh aspect, alone or in combination with one or more of the first through tenth aspects, process 1000 includes receiving an indication of a UE capability to monitor pre-paging, and transmitting the request includes transmitting the request based at least in part on the UE capability.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
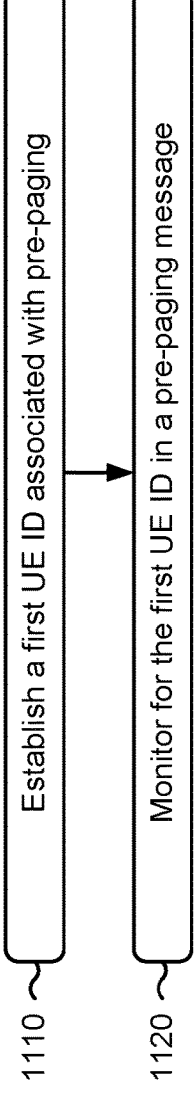
FIG. 11 is a diagram illustrating an example process performed, for example, at a UE or an apparatus of a UE, in accordance with the present disclosure.

FIG. 11 is a diagram illustrating an example process 1100 performed, for example, at a UE or an apparatus of a UE, in accordance with the present disclosure. Example process 1100 is an example where the apparatus or the UE (e.g., UE 120, UE 610) performs operations associated with configuring pre-paging.

As shown in FIG. 11, in some aspects, process 1100 may include establishing a first UE ID associated with pre-paging (block 1110). For example, the UE (e.g., using communication manager 140 and/or pre-paging component 1708, depicted in FIG. 17) may establish a first UE ID associated with pre-paging, as described above.

As further shown in FIG. 11, in some aspects, process 1100 may include monitoring for the first UE ID in a pre-paging message (block 1120). For example, the UE (e.g., using communication manager 140 and/or monitoring component 1710, depicted in FIG. 17) may monitor for the first UE ID in a pre-paging message, as described above.

Process 1100 may include additional aspects, such as any single aspect or any combination of aspects described below and/or in connection with one or more other processes described elsewhere herein.

In a first aspect, establishing the first UE ID includes receiving the first UE ID, and transmitting a registration complete message.

In a second aspect, alone or in combination with the first aspect, process 1100 includes transmitting an indication of a UE capability to monitor pre-paging.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
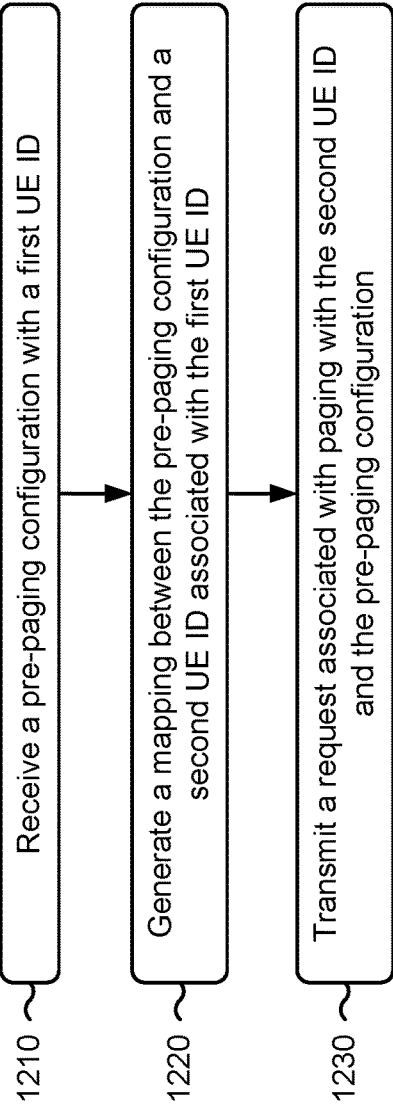
FIG. 12 is a diagram illustrating an example process performed, for example, at a first network entity or an apparatus of a first network entity, in accordance with the present disclosure.

FIG. 12 is a diagram illustrating an example process 1200 performed, for example, at a first network entity or an apparatus of a first network entity, in accordance with the present disclosure. Example process 1200 is an example where the apparatus or the first network entity (e.g., network node 110, core network node 115, AMF 630) performs operations associated with configuring pre-paging.

As shown in FIG. 12, in some aspects, process 1200 may include receiving a pre-paging configuration with a first UE ID (block 1210). For example, the first network entity (e.g., using communication manager 160 and/or reception component 1402, depicted in FIG. 14) may receive a pre-paging configuration with a first UE ID, as described above.

As further shown in FIG. 12, in some aspects, process 1200 may include generating a mapping between the pre-paging configuration and a second UE ID associated with the first UE ID (block 1220). For example, the first network entity (e.g., using communication manager 160 and/or mapping component 1410, depicted in FIG. 14) may generate a mapping between the pre-paging configuration and a second UE ID associated with the first UE ID, as described above.

As further shown in FIG. 12, in some aspects, process 1200 may include transmitting a request associated with paging with the second UE ID and the pre-paging configuration (block 1230). For example, the first network entity (e.g., using communication manager 160 and/or transmission component 1404, depicted in FIG. 14) may transmit a request associated with paging with the second UE ID and the pre-paging configuration, as described above.

Process 1200 may include additional aspects, such as any single aspect or any combination of aspects described below and/or in connection with one or more other processes described elsewhere herein.

In a first aspect, the pre-paging configuration indicates a time and frequency resource assignment for pre-paging and a temporary UE ID as the first UE ID.

In a second aspect, alone or in combination with the first aspect, the time and frequency resource assignment and the temporary UE ID are associated with a setup time and a validity duration.

In a third aspect, alone or in combination with one or more of the first and second aspects, the request is a pre-paging request, and transmitting the request includes transmitting the request based at least in part on an expiration of a timer that starts after a paging request.

In a fourth aspect, alone or in combination with one or more of the first through third aspects, transmitting the request includes transmitting the request in response to receiving a UE context release message.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
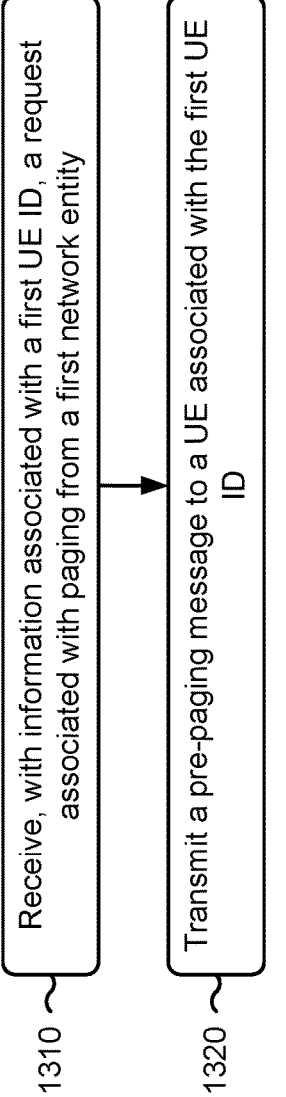
FIG. 13 is a diagram illustrating an example process performed, for example, at a second network entity or an apparatus of a second network entity, in accordance with the present disclosure.

FIG. 13 is a diagram illustrating an example process 1300 performed, for example, at a second network entity or an apparatus of a second network entity, in accordance with the present disclosure. Example process 1300 is an example where the apparatus or the second network entity (e.g., network node 110, RAN network entity 620) performs operations associated with configuring pre-paging.

As shown in FIG. 13, in some aspects, process 1300 may include receiving, with information associated with a first UE ID, a request associated with paging from a first network entity (block 1310). For example, the second network entity (e.g., using communication manager 150 and/or reception component 2002, depicted in FIG. 20) may receive, with information associated with a first UE ID, a request associated with paging from a first network entity, as described above.

As further shown in FIG. 13, in some aspects, process 1300 may include transmitting a pre-paging message to a UE associated with the first UE ID (block 1320). For example, the second network entity (e.g., using communication manager 150 and/or transmission component 2004, depicted in FIG. 20) may transmit a pre-paging message to a UE associated with the first UE ID, as described above.

Process 1300 may include additional aspects, such as any single aspect or any combination of aspects described below and/or in connection with one or more other processes described elsewhere herein.

In a first aspect, the information associated with the first UE ID includes the first UE ID, and the request is a pre-paging request.

In a second aspect, alone or in combination with the first aspect, the information associated with the first UE ID includes a second UE ID and information associated with deriving the first UE ID, and the request is a pre-paging request.

In a third aspect, alone or in combination with one or more of the first and second aspects, the information associated with deriving the first UE ID includes one or more of a 5G S-TMSI, geographical area information of a UE, a bit map, a masking function, or a predefined function.

In a fourth aspect, alone or in combination with one or more of the first through third aspects, the information associated with the first UE ID includes the first UE ID, and the request is a paging request.

In a fifth aspect, alone or in combination with one or more of the first through fourth aspects, the information associated with the first UE ID includes information associated with deriving the first UE ID, where the request is a paging request, and process 1300 includes deriving the first UE ID based at least in part on the information associated with deriving the first UE ID.

In a sixth aspect, alone or in combination with one or more of the first through fifth aspects, process 1300 includes selecting the pre-paging message.

In a seventh aspect, alone or in combination with one or more of the first through sixth aspects, process 1300 includes transmitting a pre-paging configuration with the first UE ID to the first network entity, and receiving the request includes receiving the request with the pre-paging configuration.

In an eighth aspect, alone or in combination with one or more of the first through seventh aspects, the pre-paging configuration indicates a time and frequency resource assignment by the second network entity.

In a ninth aspect, alone or in combination with one or more of the first through eighth aspects, receiving the request includes receiving the request in response to transmitting a UE context release message.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
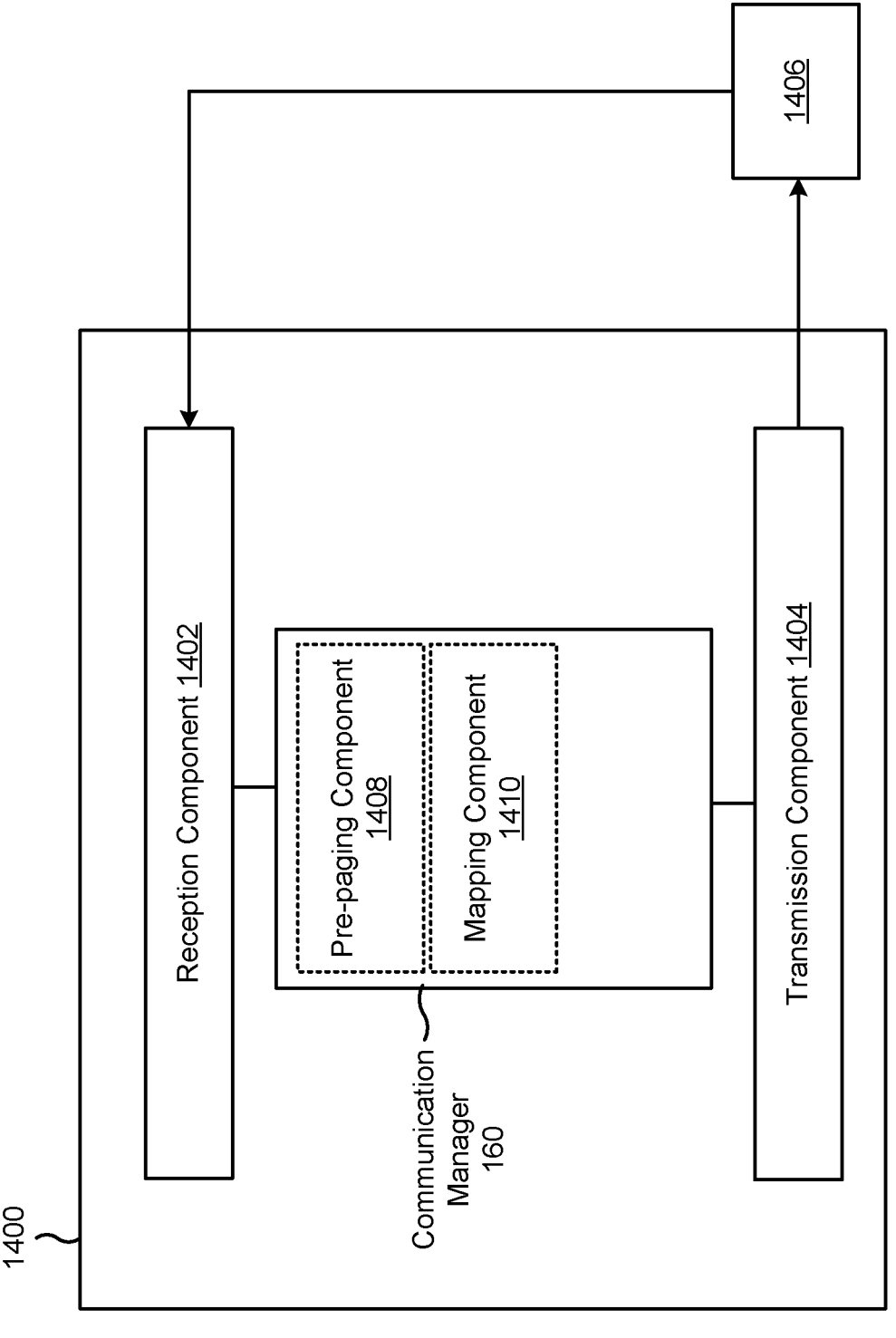
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a first network entity (e.g., network node 110, core network node 115, AMF 630), or a first network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 160. The communication manager 160 may include a pre-paging component 1408 and/or a mapping component 1410, among other examples.

In some aspects, the apparatus 1400 may be configured to perform one or more operations described herein in connection with FIGS. 1-9. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the first network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, one or more modems, one or more demodulators, one or more MIMO detectors, one or more receive processors, one or more controllers/processors, one or more memories, or a combination thereof, of the first network entity described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, one or more modems, one or more modulators, one or more transmit MIMO processors, one or more transmit processors, one or more controllers/processors, one or more memories, or a combination thereof, of the first network entity described in connection with FIG. 2. In some aspects, the transmission component 1404 may be co-located with the reception component 1402 in one or more transceivers.

In some aspects, the pre-paging component 1408 may establish a first UE ID associated with pre-paging. The transmission component 1404 may transmit, with information associated with the first UE ID, a request associated with paging to a second network entity.

The pre-paging component 1408 may derive the first UE ID from one or more of a paging UE ID, a 5G S-TMSI associated with a UE, geographical area information of a UE, a bit map, a masking function, a preconfigured function, a predefined function, and/or other UE identity information.

The pre-paging component 1408 may maintain a timer associated with pre-paging that starts based at least in part on the request. The transmission component 1404 may transmit a new request based at least in part on expiration of the timer.

The reception component 1402 may receive an indication of a UE capability to monitor pre-paging, and the transmission component 1404 may transmit the request based at least in part on the UE capability.

In some aspects, the reception component 1402 may receive a pre-paging configuration with a first UE ID. The mapping component 1410 may generate a mapping between the pre-paging configuration and a second UE ID associated with the first UE ID. The transmission component 1404 may transmit a request associated with paging with the second UE ID and the pre-paging configuration.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
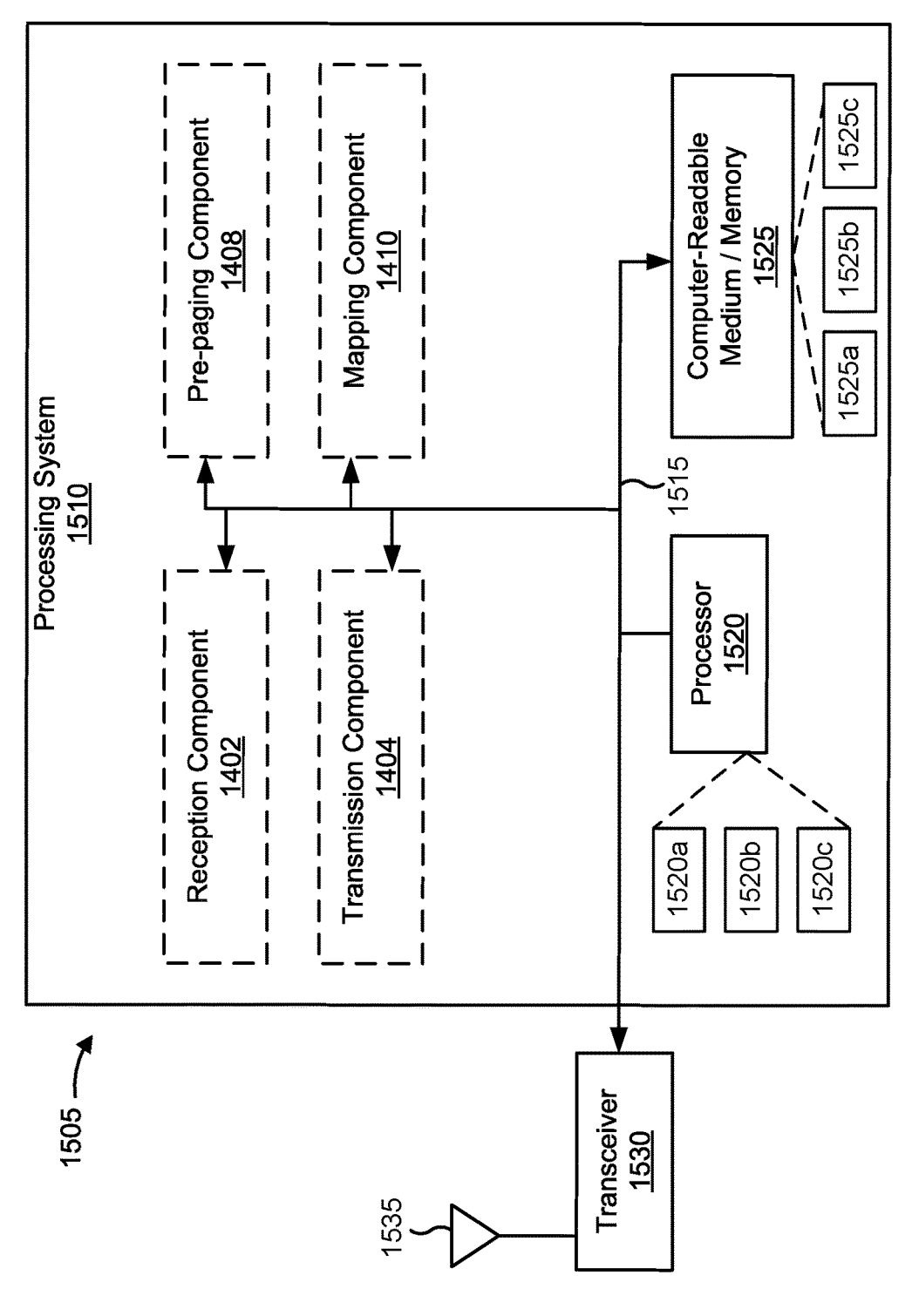
FIG. 15 is a diagram illustrating an example of a hardware implementation for an apparatus employing a processing system, in accordance with the present disclosure.

FIG. 15 is a diagram illustrating an example 1500 of a hardware implementation for an apparatus 1505 employing a processing system 1510, in accordance with the present disclosure. The apparatus 1505 may be a first network entity or may be at (e.g., included in) a first network entity.

The processing system 1510 may be implemented with a bus architecture, represented generally by the bus 1515. The bus 1515 may include any number of interconnecting buses and bridges depending on the specific application of the processing system 1510 and the overall design constraints. The bus 1515 links together various circuits including one or more processors and/or hardware components, represented by the processor (or processing circuitry) 1520, the illustrated components, and the computer-readable medium/memory (or memory circuitry) 1525. The processor 1520 may include multiple processors, such as processor 1520a, memory 1520b, and memory 1520c. The memory 1525 may include multiple memories, such as memory 1525a, memory 1525b, and memory 1525c. The bus 1515 may also link various other circuits, such as timing sources, peripherals, voltage regulators, and/or power management circuits.

The processing system 1510 may be coupled to one or more transceivers 1530. A transceiver 1530 is coupled to one or more antennas 1535. The transceiver 1530 provides a means for communicating with various other apparatuses over a transmission medium. The transceiver 1530 receives a signal from the one or more antennas 1535, extracts information from the received signal, and provides the extracted information to the processing system 1510, specifically the reception component 1402. In addition, the transceiver 1530 receives information from the processing system 1510, specifically the transmission component 1404, and generates a signal to be applied to the one or more antennas 1535 based at least in part on the received information.

The processing system 1510 includes one or more processors 1520 coupled to a computer-readable medium/memory 1525. A processor 1520 is responsible for general processing, including the execution of software stored on the computer-readable medium/memory 1525. The software, when executed by the processor 1520, causes the processing system 1510 to perform the various functions described herein for any particular apparatus. The computer-readable medium/memory 1525 may also be used for storing data that is manipulated by the processor 1520 when executing software. The processing system further includes at least one of the illustrated components. The components may be software modules running in the processor 1520, resident/stored in the computer readable medium/memory 1525, one or more hardware modules coupled to the processor 1520, or some combination thereof.

In some aspects, the processing system 1510 may be a component of the network node 110 and may include one or more memories, such as the memory 242, and/or may include one or more processors, such as at least one of the TX MIMO processor 230, the RX processor 238, and/or the controller/processor 240. In some aspects, the apparatus 1505 for wireless communication includes means for establishing a first UE ID associated with pre-paging; and means for transmitting, with information associated with the first UE ID, a request associated with paging to a second network entity. In some aspects, the apparatus 1505 for wireless communication includes means receiving a pre-paging configuration with a first UE ID; means for generating a mapping between the pre-paging configuration and a second UE ID associated with the first UE ID; and means for transmitting a request associated with paging with the second UE ID and the pre-paging configuration. The aforementioned means may be one or more of the aforementioned components of the apparatus 1400 and/or the processing system 1510 of the apparatus 1505 configured to perform the functions recited by the aforementioned means. As described elsewhere herein, the processing system 1510 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 15 is provided as an example. Other examples may differ from what is described in connection with FIG. 15.

Figure 16:
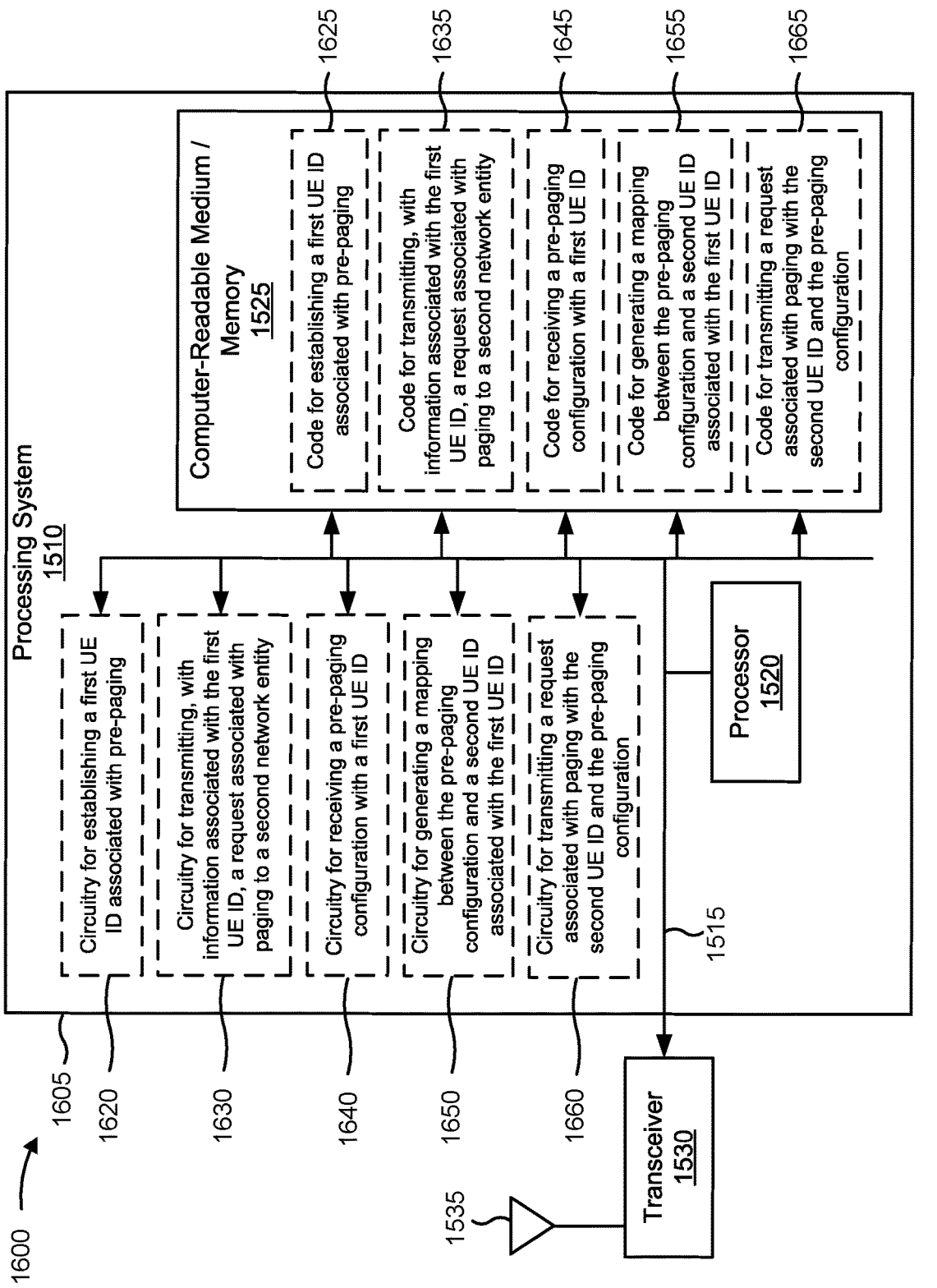
FIG. 16 is a diagram illustrating an example of an implementation of code and circuitry for an apparatus, in accordance with the present disclosure.

FIG. 16 is a diagram illustrating an example 1600 of an implementation of code and circuitry for an apparatus 1605, in accordance with the present disclosure. The circuitry may include processing circuitry and memory circuitry. The apparatus 1605 may be a first network entity, or a first network entity may include the apparatus 1605.

As shown in FIG. 16, the apparatus 1605 may include circuitry for establishing a first UE ID associated with pre-paging (circuitry 1620). For example, the circuitry 1620 may enable the apparatus 1605 to establish a first UE ID associated with pre-paging.

As shown in FIG. 16, the apparatus 1605 may include, stored in computer-readable medium 1525, code for establishing a first UE ID associated with pre-paging (code 1625). For example, the code 1625, when executed by processor 1520, may cause processor 1520 to cause transceiver 1530 to establish a first UE ID associated with pre-paging.

As shown in FIG. 16, the apparatus 1605 may include circuitry for transmitting, with information associated with the first UE ID, a request associated with paging to a second network entity (circuitry 1630). For example, the circuitry 1630 may enable the apparatus 1605 to transmit, with information associated with the first UE ID, a request associated with paging to a second network entity.

As shown in FIG. 16, the apparatus 1605 may include, stored in computer-readable medium 1525, code for transmitting, with information associated with the first UE ID, a request associated with paging to a second network entity (code 1635). For example, the code 1635, when executed by processor 1520, may cause processor 1520 to cause transceiver 1530 to transmit, with information associated with the first UE ID, a request associated with paging to a second network entity.

As shown in FIG. 16, the apparatus 1605 may include circuitry for receiving a pre-paging configuration with a first UE ID (circuitry 1640). For example, the circuitry 1640 may enable the apparatus 1605 to receive a pre-paging configuration with a first UE ID.

As shown in FIG. 16, the apparatus 1605 may include, stored in computer-readable medium 1525, code for receiving a pre-paging configuration with a first UE ID (code 1645). For example, the code 1645, when executed by processor 1520, may cause processor 1520 to cause transceiver 1530 to receive a pre-paging configuration with a first UE ID.

As shown in FIG. 16, the apparatus 1605 may include circuitry for generating a mapping between the pre-paging configuration and a second UE ID associated with the first UE ID (circuitry 1650). For example, the circuitry 1650 may enable the apparatus 1605 to generate a mapping between the pre-paging configuration and a second UE ID associated with the first UE ID.

As shown in FIG. 16, the apparatus 1605 may include, stored in computer-readable medium 1525, code for generating a mapping between the pre-paging configuration and a second UE ID associated with the first UE ID (code 1655). For example, the code 1655, when executed by processor 1520, may cause processor 1520 generate a mapping between the pre-paging configuration and a second UE ID associated with the first UE ID.

As shown in FIG. 16, the apparatus 1605 may include circuitry for transmitting a request associated with paging with the second UE ID and the pre-paging configuration (circuitry 1660). For example, the circuitry 1660 may enable the apparatus 1605 to transmit a request associated with paging with the second UE ID and the pre-paging configuration.

As shown in FIG. 16, the apparatus 1605 may include, stored in computer-readable medium 1525, code for transmitting a request associated with paging with the second UE ID and the pre-paging configuration (code 1665). For example, the code 1665, when executed by processor 1520, may cause processor 1520 to cause transceiver 1530 to transmit a request associated with paging with the second UE ID and the pre-paging configuration.

FIG. 16 is provided as an example. Other examples may differ from what is described in connection with FIG. 16.

Figure 17:
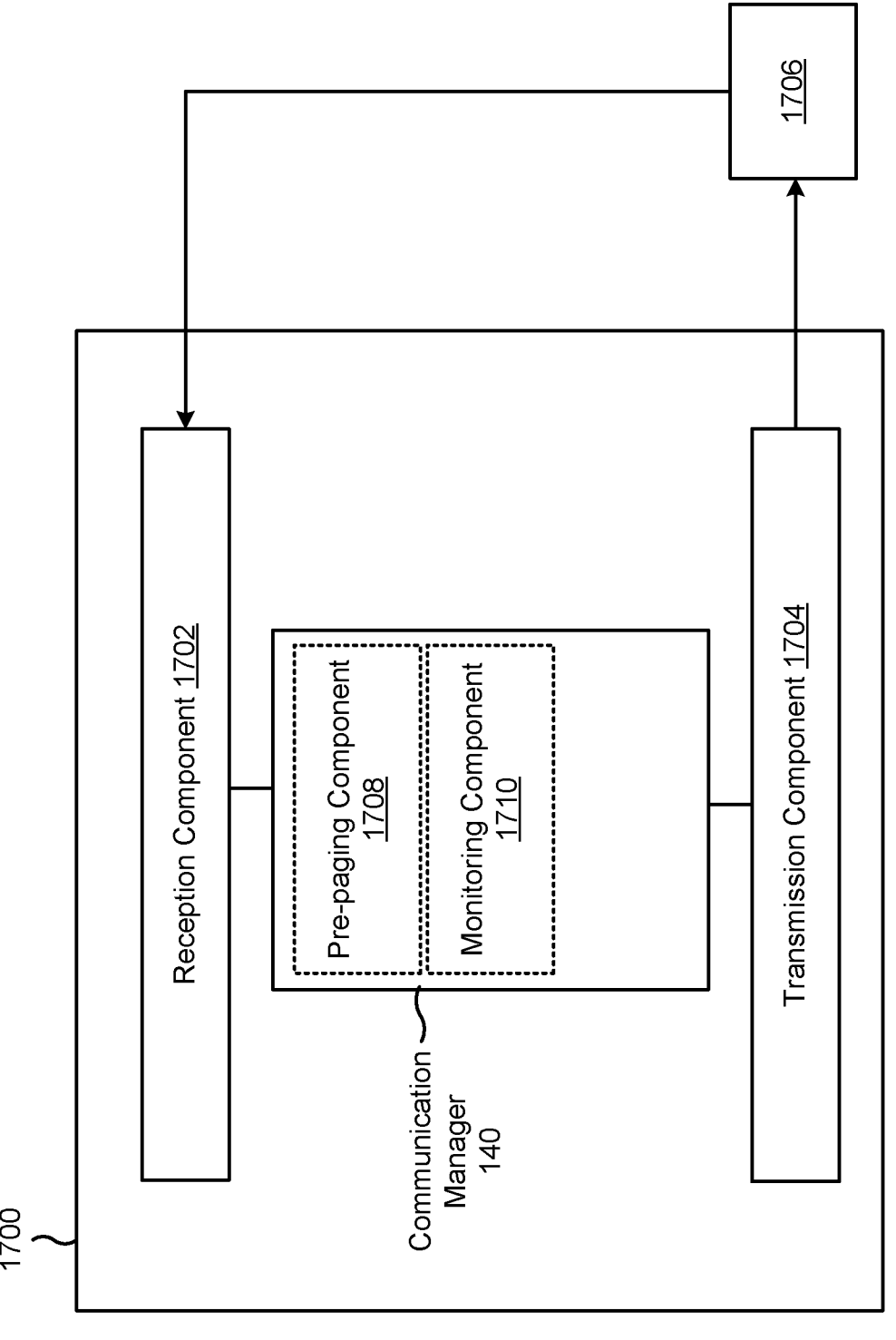
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a UE (e.g., UE 120, UE 610), or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 140. The communication manager 140 may include a pre-paging component 1708 and/or a monitoring component 1710, among other examples.

In some aspects, the apparatus 1700 may be configured to perform one or more operations described herein in connection with FIGS. 1-9. Additionally, or alternatively, the apparatus 1700 may be configured to perform one or more processes described herein, such as process 1100 of FIG. 11. In some aspects, the apparatus 1700 and/or one or more components shown in FIG. 17 may include one or more components of the UE described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1704 may be co-located with the reception component 1702 in one or more transceivers.

The pre-paging component 1708 may establish a first UE ID associated with pre-paging. The monitoring component 1710 may monitor for the first UE ID in a pre-paging message. The transmission component 1704 may transmit an indication of a UE capability to monitor pre-paging.

In some aspects, the pre-paging component 1408 may derive the first UE ID from one or more of a paging UE ID, a 5G S-TMSI associated with a UE, geographical area information of a UE, a bit map, a masking function, a preconfigured function, a predefined function, and/or other UE identity information.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
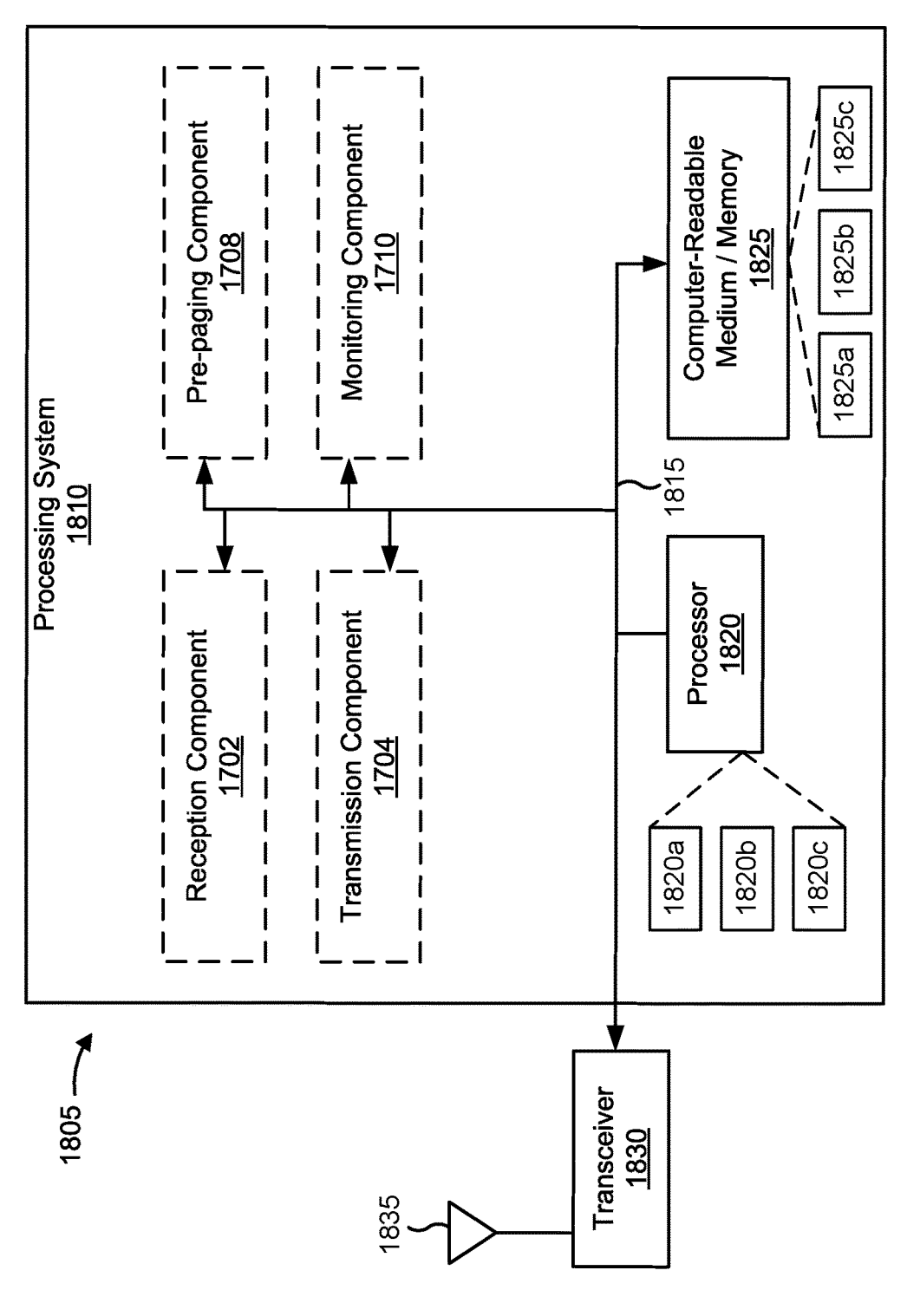
FIG. 18 is a diagram illustrating an example of a hardware implementation for an apparatus employing a processing system, in accordance with the present disclosure.

FIG. 18 is a diagram illustrating an example 1800 of a hardware implementation for an apparatus 1805 employing a processing system 1810, in accordance with the present disclosure. The apparatus 1805 may be a UE or may be at (e.g., included in) a UE.

The processing system 1810 may be implemented with a bus architecture, represented generally by the bus 1815. The bus 1815 may include any number of interconnecting buses and bridges depending on the specific application of the processing system 1810 and the overall design constraints. The bus 1815 links together various circuits including one or more processors and/or hardware components, represented by the processor (or processing circuitry) 1820, the illustrated components, and the computer-readable medium/memory (or memory circuitry) 1825. The processor 1820 may include multiple processors, such as processor 1820*a*, memory 1820*b*, and memory 1820*c*. The memory 1825 may include multiple memories, such as memory 1825*a*, memory 1825*b*, and memory 1825*c*. The bus 1815 may also link various other circuits, such as timing sources, peripherals, voltage regulators, and/or power management circuits.

The processing system 1810 may be coupled to one or more transceivers 1830. A transceiver 1830 is coupled to one or more antennas 1835. The transceiver 1830 provides a means for communicating with various other apparatuses over a transmission medium. The transceiver 1830 receives a signal from the one or more antennas 1835, extracts information from the received signal, and provides the extracted information to the processing system 1810, specifically the reception component 1702. In addition, the transceiver 1830 receives information from the processing system 1810, specifically the transmission component 1704, and generates a signal to be applied to the one or more antennas 1835 based at least in part on the received information.

The processing system 1810 includes one or more processors 1820 coupled to a computer-readable medium/memory 1825. A processor 1820 is responsible for general processing, including the execution of software stored on the computer-readable medium/memory 1825. The software, when executed by the processor 1820, causes the processing system 1810 to perform the various functions described herein for any particular apparatus. The computer-readable medium/memory 1825 may also be used for storing data that is manipulated by the processor 1820 when executing software. The processing system further includes at least one of the illustrated components. The components may be software modules running in the processor 1820, resident/stored in the computer readable medium/memory 1825, one or more hardware modules coupled to the processor 1820, or some combination thereof.

In some aspects, the processing system 1810 may be a component of the UE 120 and may include one or more memories, such as the memory 282, and/or May include one or more processors, such as at least one of the TX MIMO processor 266, the RX processor 258, and/or the controller/processor 280. In some aspects, the apparatus 1805 for wireless communication includes means for establishing a first UE ID associated with pre-paging; and means for monitoring for the first UE ID in a pre-paging message. The aforementioned means may be one or more of the aforementioned components of the apparatus 1700 and/or the processing system 1810 of the apparatus 1805 configured to perform the functions recited by the aforementioned means.

As described elsewhere herein, the processing system 1810 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 18 is provided as an example. Other examples may differ from what is described in connection with FIG. 18.

Figure 19:
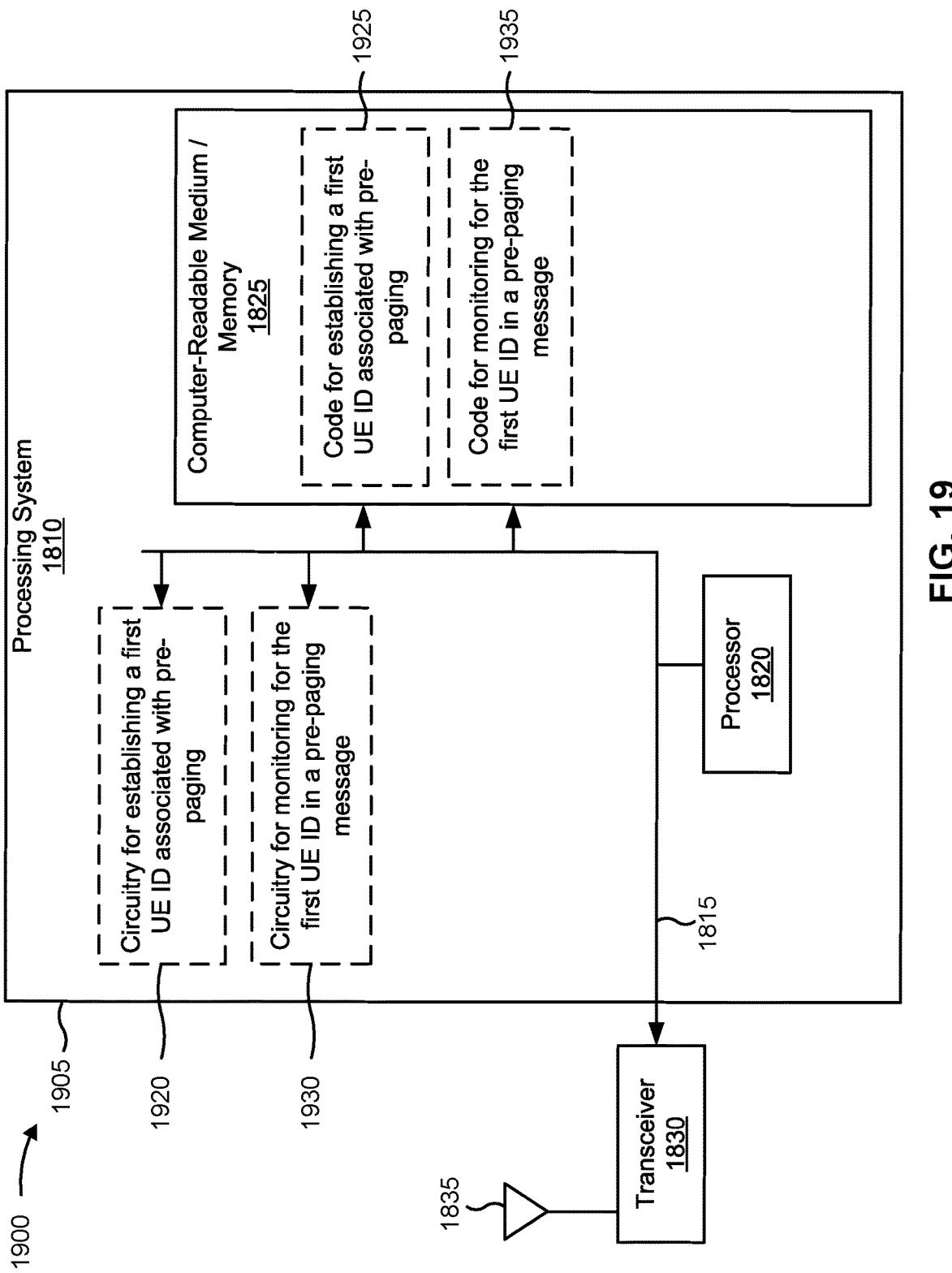
FIG. 19 is a diagram illustrating an example of an implementation of code and circuitry for an apparatus, in accordance with the present disclosure.

FIG. 19 is a diagram illustrating an example 1900 of an implementation of code and circuitry for an apparatus 1905, in accordance with the present disclosure. The circuitry may include processing circuitry and memory circuitry. The apparatus 1905 may be a UE, or a UE may include the apparatus 1905.

As shown in FIG. 19, the apparatus 1905 may include circuitry for establishing a first UE ID associated with pre-paging (circuitry 1920). For example, the circuitry 1920 may enable the apparatus 1905 to establish a first UE ID associated with pre-paging.

As shown in FIG. 19, the apparatus 1905 may include, stored in computer-readable medium 1825, code for establishing a first UE ID associated with pre-paging (code 1925). For example, the code 1925, when executed by processor 1820, may cause processor 1820 to cause transceiver 1830 to establish a first UE ID associated with pre-paging.

As shown in FIG. 19, the apparatus 1905 may include circuitry for monitoring for the first UE ID in a pre-paging message (circuitry 1930). For example, the circuitry 1930 may enable the apparatus 1905 to monitor for the first UE ID in a pre-paging message.

As shown in FIG. 19, the apparatus 1905 may include, stored in computer-readable medium 1825, code for monitoring for the first UE ID in a pre-paging message (code 1935). For example, the code 1935, when executed by processor 1820, may cause processor 1820 to cause transceiver 1830 to monitor for the first UE ID in a pre-paging message.

FIG. 19 is provided as an example. Other examples may differ from what is described in connection with FIG. 19.

Figure 20:
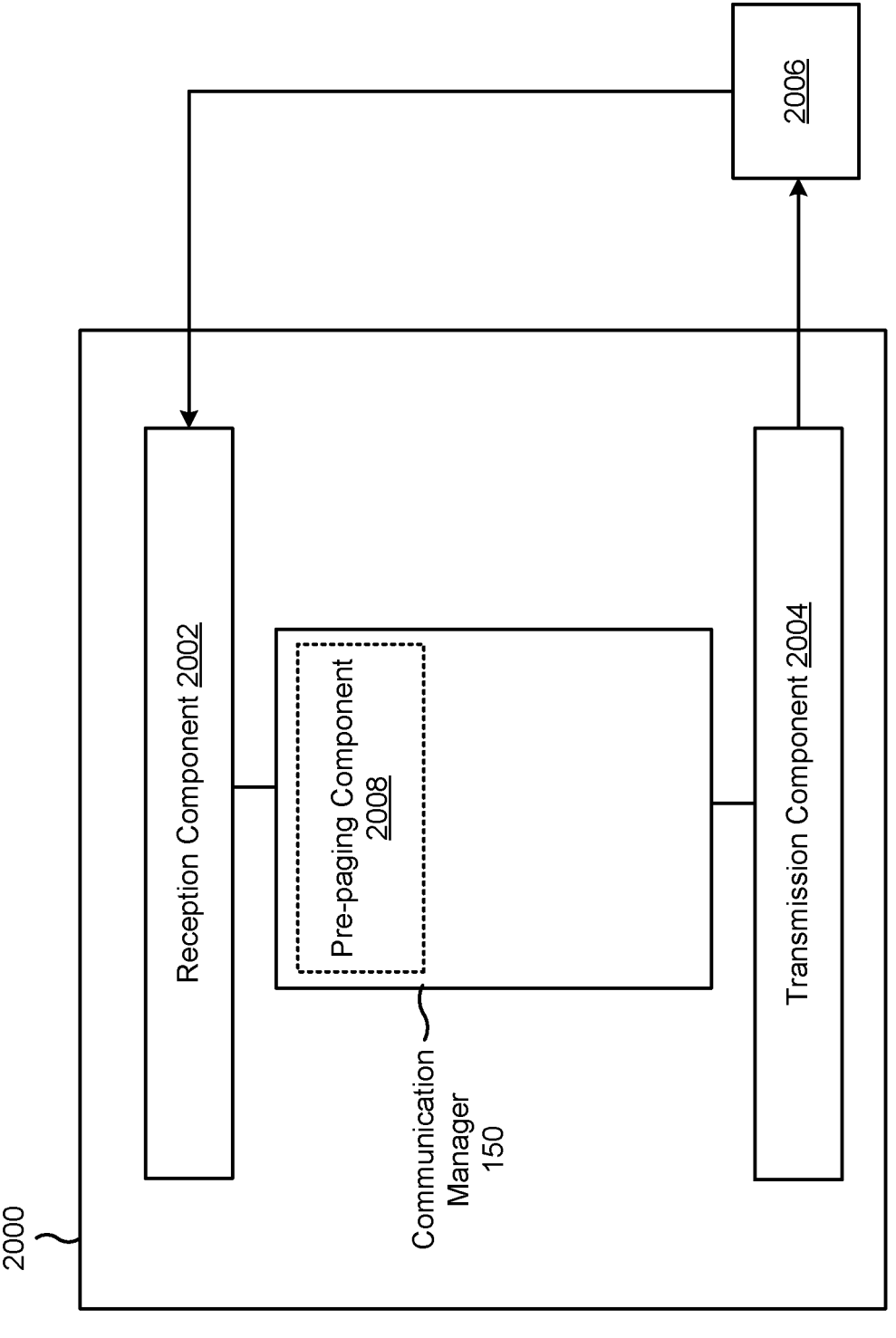
FIG. 20 is a diagram of an example apparatus for wireless communication, in accordance with the present disclosure.

FIG. 20 is a diagram of an example apparatus 2000 for wireless communication, in accordance with the present disclosure. The apparatus 2000 may be a second network entity (e.g., network node 110, RAN network entity 620), or a second network entity may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, or another wireless communication device) using the reception component 2002 and the transmission component 2004. As further shown, the apparatus 2000 may include the communication manager 150. The communication manager 150 may include a pre-paging component 2008, among other examples.

In some aspects, the apparatus 2000 may be configured to perform one or more operations described herein in connection with FIGS. 1-9. Additionally, or alternatively, the apparatus 2000 may be configured to perform one or more processes described herein, such as process 1300 of FIG. 13. In some aspects, the apparatus 2000 and/or one or more components shown in FIG. 20 may include one or more components of the second network entity described in connection with FIG. 2. Additionally, or alternatively, one or more components shown in FIG. 20 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2000. In some aspects, the reception component 2002 may include one or more antennas, one or more modems, one or more demodulators, one or more MIMO detectors, one or more receive processors, one or more controllers/processors, one or more memories, or a combination thereof, of the second network entity described in connection with FIG. 2.

The transmission component 2004 may transmit communications, such as reference signals, control information, data communications, or a combination thereof, to the apparatus 2006. In some aspects, one or more other components of the apparatus 2000 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, one or more modems, one or more modulators, one or more transmit MIMO processors, one or more transmit processors, one or more controllers/processors, one or more memories, or a combination thereof, of the second network entity described in connection with FIG. 2. In some aspects, the transmission component 2004 may be co-located with the reception component 2002 in one or more transceivers.

The reception component 2002 may receive, with information associated with a first UE ID, a request associated with paging from a first network entity. The transmission component 2004 may transmit a pre-paging message to a UE associated with the first UE ID.

The pre-paging component 2008 may select the pre-paging message. The transmission component 2004 may transmit a pre-paging configuration with the first UE ID to the first network entity, and wherein receiving the request includes receiving the request with the pre-paging configuration.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

Figure 21:
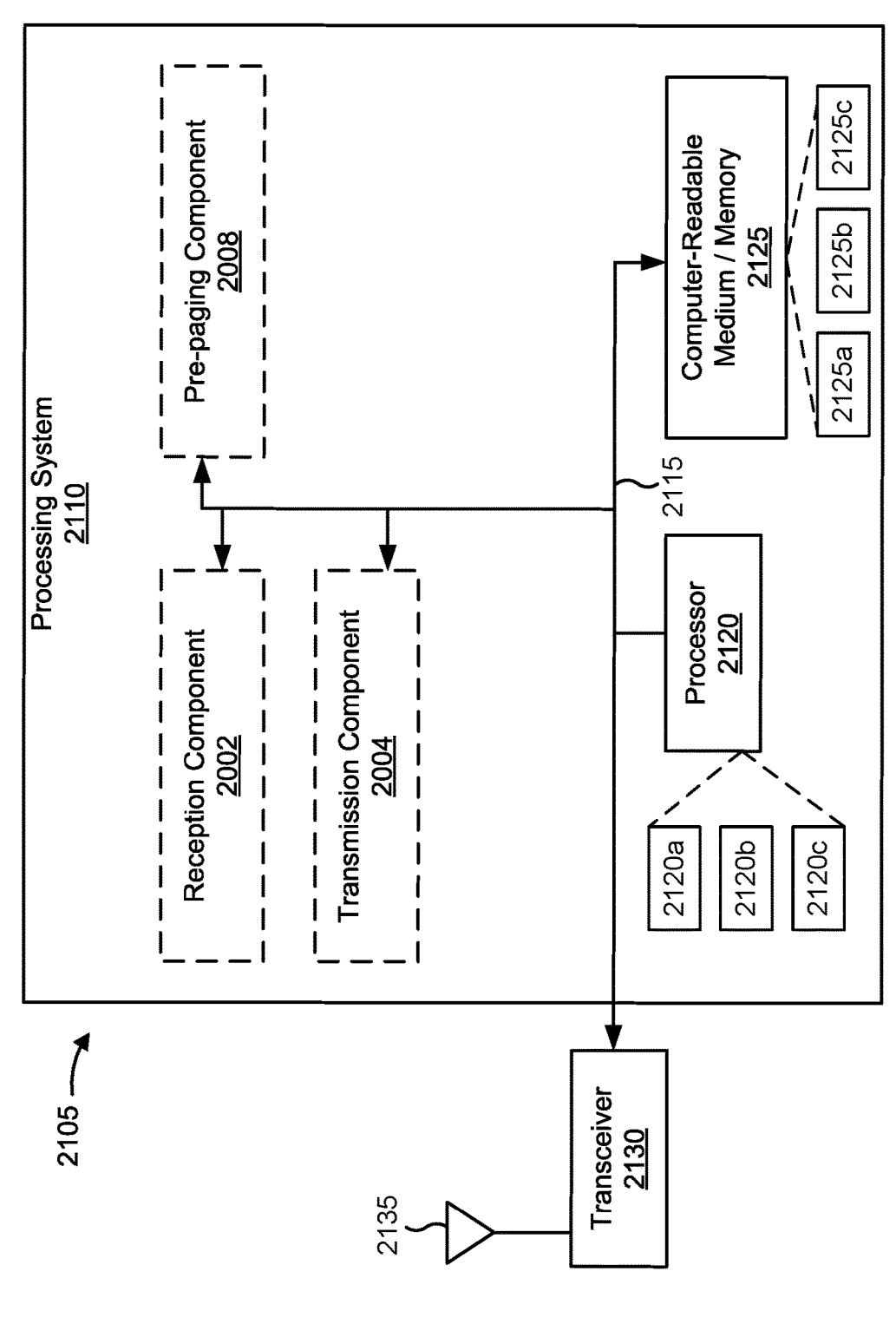
FIG. 21 is a diagram illustrating an example of a hardware implementation for an apparatus employing a processing system, in accordance with the present disclosure.

FIG. 21 is a diagram illustrating an example 2100 of a hardware implementation for an apparatus 2105 employing a processing system 2110, in accordance with the present disclosure. The apparatus 2105 may be a second network entity or may be at (e.g., included in) a second network entity.

The processing system 2110 may be implemented with a bus architecture, represented generally by the bus 2115. The bus 2115 may include any number of interconnecting buses and bridges depending on the specific application of the processing system 2110 and the overall design constraints. The bus 2115 links together various circuits including one or more processors and/or hardware components, represented by the processor (or processing circuitry) 2120, the illustrated components, and the computer-readable medium/ memory (or memory circuitry) 2125. The processor 2120 may include multiple processors, such as processor 2120a, memory 2120b, and memory 2120c. The memory 2125 may include multiple memories, such as memory 2125a, memory 2125b, and memory 2125c. The bus 2115 may also link various other circuits, such as timing sources, peripherals, voltage regulators, and/or power management circuits.

The processing system 2110 may be coupled to one or more transceivers 2130. A transceiver 2130 is coupled to one or more antennas 2135. The transceiver 2130 provides a means for communicating with various other apparatuses over a transmission medium. The transceiver 2130 receives a signal from the one or more antennas 2135, extracts information from the received signal, and provides the extracted information to the processing system 2110, specifically the reception component 2002. In addition, the transceiver 2130 receives information from the processing system 2110, specifically the transmission component 2004, and generates a signal to be applied to the one or more antennas 2135 based at least in part on the received information.

The processing system 2110 includes one or more processors 2120 coupled to a computer-readable medium/ memory 2125. A processor 2120 is responsible for general processing, including the execution of software stored on the computer-readable medium/memory 2125. The software, when executed by the processor 2120, causes the processing system 2110 to perform the various functions described herein for any particular apparatus. The computer-readable medium/memory 2125 may also be used for storing data that is manipulated by the processor 2120 when executing software. The processing system further includes at least one of the illustrated components. The components may be software modules running in the processor 2120, resident/stored in the computer readable medium/memory 2125, one or more hardware modules coupled to the processor 2120, or some combination thereof.

In some aspects, the processing system 2110 may be a component of the network node 110 and may include one or more memories, such as the memory 242, and/or may include one or more processors, such as at least one of the TX MIMO processor 230, the RX processor 238, and/or the controller/processor 240. In some aspects, the apparatus 2105 for wireless communication includes means receiving, with information associated with a first UE ID, a request associated with paging from a first network entity; and means for transmitting a pre-paging message to a UE associated with the first UE ID. The aforementioned means may be one or more of the aforementioned components of the apparatus 2000 and/or the processing system 2110 of the apparatus 2105 configured to perform the functions recited by the aforementioned means. As described elsewhere herein, the processing system 2110 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 21 is provided as an example. Other examples may differ from what is described in connection with FIG. 21.

Figure 22:
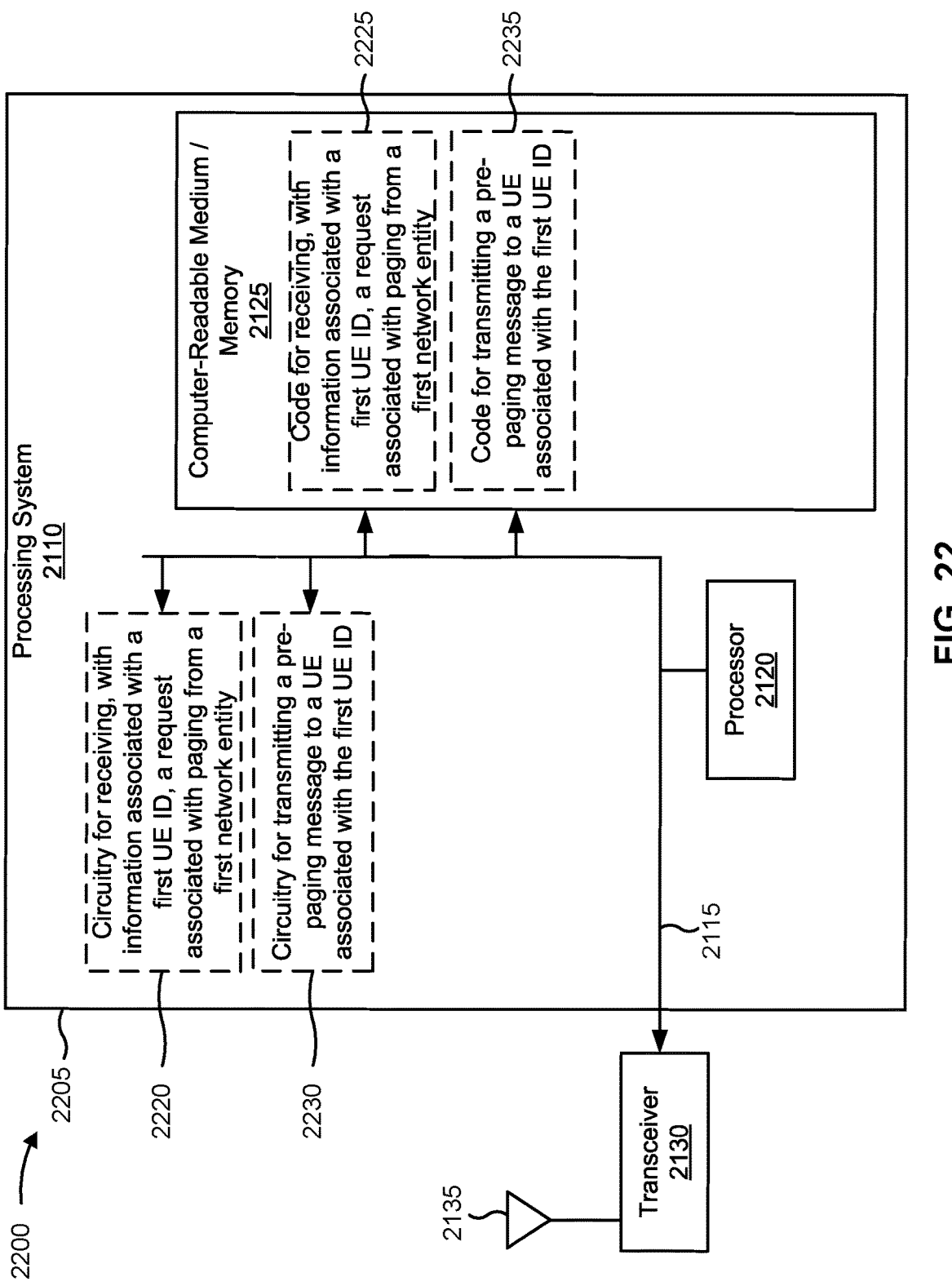
FIG. 22 is a diagram illustrating an example of an implementation of code and circuitry for an apparatus, in accordance with the present disclosure.

FIG. 22 is a diagram illustrating an example 2200 of an implementation of code and circuitry for an apparatus 2205, in accordance with the present disclosure. The circuitry may include processing circuitry and memory circuitry. The apparatus 2205 may be a second network entity, or a second network entity may include the apparatus 2205.

As shown in FIG. 22, the apparatus 2205 may include circuitry for receiving, with information associated with a first UE ID, a request associated with paging from a first network entity (circuitry 2220). For example, the circuitry 2220 may enable the apparatus 2205 to receive, with information associated with a first UE ID, a request associated with paging from a first network entity.

As shown in FIG. 22, the apparatus 2205 may include, stored in computer-readable medium 2125, code for receiving, with information associated with a first UE ID, a request associated with paging from a first network entity (code 2225). For example, the code 2225, when executed by processor 2120, may cause processor 2120 to cause transceiver 2130 to receive, with information associated with a first UE ID, a request associated with paging from a first network entity.

As shown in FIG. 22, the apparatus 2205 may include circuitry for transmitting a pre-paging message to a UE associated with the first UE ID (circuitry 2230). For example, the circuitry 2230 may enable the apparatus 2205 to transmit a pre-paging message to a UE associated with the first UE ID.

As shown in FIG. 22, the apparatus 2205 may include, stored in computer-readable medium 2125, code for transmitting a pre-paging message to a UE associated with the first UE ID (code 2235). For example, the code 2235, when executed by processor 2120, may cause processor 2120 to cause transceiver 2130 to transmit a pre-paging message to a UE associated with the first UE ID.

FIG. 22 is provided as an example. Other examples may differ from what is described in connection with FIG. 22.

The following provides an overview of some Aspects of the present disclosure:

Aspect 1: A method of wireless communication performed at a first network entity, comprising: establishing a first user equipment (UE) identifier (ID) associated with pre-paging; and transmitting, with information associated with the first UE ID, a request associated with paging to a second network entity.

Aspect 2: The method of Aspect 1, wherein establishing the first UE ID includes: transmitting the first UE ID; and receiving a registration complete message.

Aspect 3: The method of any of Aspects 1-2, wherein transmitting the request includes transmitting the request in response to receiving a UE context release message.

Aspect 4: The method of any of Aspects 1-3, wherein the information associated with the first UE ID includes the first UE ID, and wherein the request is a pre-paging request.

Aspect 5: The method of any of Aspects 1-3, wherein the information associated with the first UE ID includes a second UE ID and information associated with deriving the first UE ID, and wherein the request is a pre-paging request.

Aspect 6: The method of any of Aspects 1-3, wherein the information associated with the first UE ID includes the first UE ID, and wherein the request is a paging request.

Aspect 7: The method of any of Aspects 1-3, wherein the information associated with the first UE ID includes information associated with deriving the first UE ID, and wherein the request is a paging request.

Aspect 8: The method of Aspect 7, wherein the information associated with deriving the first UE ID includes one or more of a 5G serving temporary mobile subscriber identity (S-TMSI), geographical area information of a UE, a bit map, a masking function, a preconfigured function, or a predefined function.

Aspect 9: The method of any of Aspects 1-8, further comprising deriving the first UE ID from one or more of a second UE ID associated with the UE, a 5G serving temporary mobile subscriber identity (S-TMSI) associated with a UE, geographical area information of a UE, a bit map, a masking function, a preconfigured function, or a predefined function.

Aspect 10: The method of Aspect 9, wherein the first UE ID is shorter in length than the 5G S-TMSI.

Aspect 11: The method of any of Aspects 1-10, further comprising: maintaining a timer associated with pre-paging that starts based at least in part on the request; and transmitting a new request based at least in part on expiration of the timer.

Aspect 12: The method of any of Aspects 1-11, further comprising receiving an indication of a UE capability to monitor pre-paging, and wherein transmitting the request includes transmitting the request based at least in part on the UE capability.

Aspect 13: A method of wireless communication performed at a user equipment (UE), comprising: establishing a first UE ID associated with pre-paging; and monitoring for the first UE ID in a pre-paging message.

Aspect 14: The method of Aspect 13, wherein establishing the first UE ID includes: receiving the first UE ID; and transmitting a registration complete message.

Aspect 15: The method of any of Aspects 13-14, further comprising transmitting an indication of a UE capability to monitor pre-paging.

Aspect 16: A method of wireless communication performed at a first network entity, comprising: receiving a pre-paging configuration with a first user equipment (UE) identifier (ID); generating a mapping between the pre-paging configuration and a second UE ID associated with the first UE ID; and transmitting a request associated with paging with the second UE ID and the pre-paging configuration.

Aspect 17: The method of Aspect 16, wherein the pre-paging configuration indicates a time and frequency resource assignment for pre-paging and a temporary UE ID as the first UE ID.

Aspect 18: The method of Aspect 17, wherein the time and frequency resource assignment and the temporary UE ID are associated with a setup time and a validity duration.

Aspect 19: The method of Aspect 16, wherein the pre-paging configuration indicates a time and frequency resource assignment for pre-paging.

Aspect 20: The method of Aspect 19, wherein the time and frequency resource assignment is associated with a setup time.

Aspect 21: The method of Aspect 19, wherein the time and frequency resource assignment is associated with a validity duration.

Aspect 22: The method of Aspect 16, wherein the pre-paging configuration indicates a temporary UE ID.

Aspect 23: The method of Aspect 22, wherein the temporary UE ID is associated with a setup time.

Aspect 24: The method of Aspect 22, wherein the temporary UE ID is associated with a validity duration.

Aspect 25: The method of any of Aspects 16-24, wherein the request is a pre-paging request, and wherein transmitting the request includes transmitting the request based at least in part on an expiration of a timer that starts after a paging request.

Aspect 26: The method of any of Aspects 16-25, wherein transmitting the request includes transmitting the request in response to receiving a UE context release message.

Aspect 27: A method of wireless communication performed at a second network entity, comprising: receiving, with information associated with a first user equipment (UE) identifier (ID), a request associated with paging from a first network entity; and transmitting a pre-paging message to a UE associated with the first UE ID.

Aspect 28: The method of Aspect 27, wherein the information associated with the first UE ID includes the first UE ID, and wherein the request is a pre-paging request.

Aspect 29: The method of Aspect 27, wherein the information associated with the first UE ID includes a second UE ID and information associated with deriving the first UE ID, and wherein the request is a pre-paging request.

Aspect 30: The method of Aspect 29, wherein the information associated with deriving the first UE ID includes one or more of a second UE ID associated with the UE, a 5G serving temporary mobile subscriber identity (S-TMSI), geographical area information of a UE, a bit map, a masking function, or a predefined function.

Aspect 31: The method of Aspect 27, wherein the information associated with the first UE ID includes the first UE ID, and wherein the request is a paging request.

Aspect 32: The method of Aspect 27, wherein the information associated with the first UE ID includes information associated with deriving the first UE ID, wherein the request is a paging request, and wherein the method includes deriving the first UE ID based at least in part on the information associated with deriving the first UE ID.

Aspect 33: The method of any of Aspects 27-32, further comprising selecting the pre-paging message.

Aspect 34: The method of any of Aspects 27-33, further comprising transmitting a pre-paging configuration with the first UE ID to the first network entity, and wherein receiving the request includes receiving the request with the pre-paging configuration.

Aspect 35: The method of Aspect 34, wherein the pre-paging configuration indicates a time and frequency resource assignment by the second network entity.

Aspect 36: The method of any of Aspects 27-35, wherein receiving the request includes receiving the request in response to transmitting a UE context release message.

Aspect 37: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-36.

Aspect 38: An apparatus for wireless communication at a device, the apparatus comprising one or more memories and one or more processors coupled to the one or more memories, the one or more processors configured to cause the device to perform the method of one or more of Aspects 1-36.

Aspect 39: An apparatus for wireless communication, the apparatus comprising at least one means for performing the method of one or more of Aspects 1-36.

Aspect 40: A non-transitory computer-readable medium storing code for wireless communication, the code comprising instructions executable by one or more processors to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

Aspect 42: A device for wireless communication, the device comprising a processing system that includes one or more processors and one or more memories coupled with the one or more processors, the processing system configured to cause the device to perform the method of one or more of Aspects 1-36.

Aspect 43: An apparatus for wireless communication at a device, the apparatus comprising one or more memories and one or more processors coupled to the one or more memories, the one or more processors individually or collectively configured to cause the device to perform the method of one or more of Aspects 1-36.

Aspect 44: An apparatus for wireless communication at a first network entity, comprising: a processing system that includes processor circuitry and memory circuitry that stores code and is coupled with the processor circuitry, the processing system configured to cause the first network entity to perform the method of one or more of Aspects 1-12 and 16-26.

Aspect 45: An apparatus for wireless communication at a user equipment (UE), comprising: a processing system that includes processor circuitry and memory circuitry that stores code and is coupled with the processor circuitry, the processing system configured to cause the UE to perform the method of one or more of Aspects 13-15.

Aspect 46: An apparatus for wireless communication at a second network entity, comprising: a processing system that includes processor circuitry and memory circuitry that stores code and is coupled with the processor circuitry, the processing system configured to cause the second network entity to perform the method of one or more of Aspects 27-36.

Aspect 48: An apparatus for wireless communication at a first network entity, comprising: one or more memories; and one or more processors coupled to the one or more memories, the one or more processors configured to cause the first network entity to: establishing a first user equipment (UE) identifier (ID) associated with pre-paging; and transmitting, with information associated with the first UE ID, a request associated with paging to a second network entity.

Aspect 49: The apparatus of Aspect 48, wherein the one or more processors are configured, individually or collectively, to cause the first network entity to: establish a first user equipment (UE) identifier (ID) associated with pre-paging; and transmit, with information associated with the first UE ID, a request associated with paging to a second network entity.

Aspect 50: An apparatus for wireless communication at a user equipment (UE), comprising: one or more memories; and one or more processors coupled to the one or more memories, the one or more processors configured to cause the UE to: establishing a first UE ID associated with pre-paging; and monitoring for the first UE ID in a pre-paging message.

Aspect 51: The apparatus of Aspect 50, wherein the one or more processors are configured, individually or collectively, to cause the UE to: establish a first UE ID associated with pre-paging; and monitor for the first UE ID in a pre-paging message.

Aspect 52: An apparatus for wireless communication at a first network entity, comprising: one or more memories; and one or more processors coupled to the one or more memories, the one or more processors configured to cause the first network entity to: receive a pre-paging configuration with a first user equipment (UE) identifier (ID); generate a mapping between the pre-paging configuration and a second UE ID associated with the first UE ID; and transmit a request associated with paging with the second UE ID and the pre-paging configuration.

Aspect 53: The apparatus of Aspect 52, wherein the one or more processors are configured, individually or collectively, to cause the first network entity to: receive a pre-paging configuration with a first user equipment (UE) identifier (ID); generate a mapping between the pre-paging configuration and a second UE ID associated with the first UE ID; and transmit a request associated with paging with the second UE ID and the pre-paging configuration.

Aspect 54: An apparatus for wireless communication at a second network entity, comprising: one or more memories; and one or more processors coupled to the one or more memories, the one or more processors configured to cause the second network entity to: receive, with information associated with a first user equipment (UE) identifier (ID), a request associated with paging from a first network entity; and transmit a pre-paging message to a UE associated with the first UE ID.

Aspect 55: The apparatus of Aspect 54, wherein the one or more processors are configured, individually or collectively, to cause the second network entity to: receive, with information associated with a first user equipment (UE) identifier (ID), a request associated with paging from a first network entity; and transmit a pre-paging message to a UE associated with the first UE ID.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first network entity, comprising:
    one or more memories; and
    one or more processors, coupled to the one or more memories, configured to cause the first network entity to:
        establish a first user equipment (UE) identifier (ID) associated with a pre-paging configuration, wherein the pre-paging configuration indicates a time and frequency resource assignment for pre-paging and a temporary UE ID, wherein the temporary UE ID corresponds to the first UE ID; and
        transmit, with information associated with the first UE ID, a request associated with paging to a second network entity.

2. The apparatus of claim 1, wherein to establish the first UE ID, the one or more processors are configured to cause the first network entity to:
    transmit the first UE ID; and
    receive a registration complete message.

3. The apparatus of claim 1, wherein to transmit the request, the one or more processors are configured to cause the first network entity to transmit the request in response to reception of a UE context release message.

4. The apparatus of claim 1, wherein the information associated with the first UE ID includes the first UE ID, and wherein the request is a pre-paging request.

5. The apparatus of claim 1, wherein the information associated with the first UE ID includes a second UE ID and information associated with derivation of the first UE ID, and wherein the request is a pre-paging request.

6. The apparatus of claim 1, wherein the information associated with the first UE ID includes the first UE ID, and wherein the request is a paging request.

7. The apparatus of claim 1, wherein the information associated with the first UE ID includes information associated with derivation of the first UE ID, and wherein the request is a paging request.

8. The apparatus of claim 7, wherein the information associated with derivation of the first UE ID includes one or more of a 5G serving temporary mobile subscriber identity (S-TMSI), geographical area information of a UE, a bit map, a masking function, a preconfigured function, or a predefined function.

9. The apparatus of claim 1, wherein the one or more processors are further configured to cause the first network entity to derive the first UE ID from one or more of a second UE ID, a 5G serving temporary mobile subscriber identity (S-TMSI) associated with a UE, geographical area information of a UE, a bit map, a masking function, a preconfigured function, or a predefined function.

10. The apparatus of claim 9, wherein the first UE ID is shorter in length than the 5G S-TMSI.

11. The apparatus of claim 1, wherein the one or more processors are further configured to cause the first network entity to:

maintain a timer associated with pre-paging that starts based at least in part on the request; and transmit a new request based at least in part on expiration of the timer.

12. The apparatus of claim 1, wherein the one or more processors are further configured to cause the first network entity to receive an indication of a UE capability to monitor pre-paging, and wherein to transmit the request, the one or more processors are configured to cause the first network entity to transmit the request based at least in part on the UE capability.

13. An apparatus for wireless communication at a user equipment (UE), comprising:

one or more memories; and one or more processors, coupled to the one or more memories, configured to cause the UE to:

establish a first user equipment (UE) identifier (ID) associated with a pre-paging configuration, wherein the pre-paging configuration indicates a time and frequency resource assignment for pre-paging and a temporary UE ID, wherein the temporary UE ID corresponds to the first UE ID; and monitor for the first UE ID in a pre-paging message.

14. The apparatus of claim 13, wherein to establish the first UE ID, the one or more processors are configured to cause the UE to:

receive the first UE ID; and transmit a registration complete message.

15. The apparatus of claim 13, wherein the one or more processors are further configured to cause the UE to transmit an indication of a UE capability to monitor pre-paging.

16. The apparatus of claim 13, wherein the first UE ID is shorter in length than a 5G serving temporary mobile subscriber identity (S-TMSI) associated with a UE.

17. The apparatus of claim 13, wherein the one or more processors are further configured to cause the UE to transmit an indication of a UE capability to monitor pre-paging.

18. An apparatus for wireless communication at a first network entity, comprising:

one or more memories; and one or more processors, coupled to the one or more memories, configured to cause the first network entity to:

receive a pre-paging configuration with a first user equipment (UE) identifier (ID) wherein the pre-paging configuration indicates a time and frequency resource assignment for pre-paging and a temporary UE ID as the first UE ID;

generate a mapping between the pre-paging configuration and a second UE ID associated with the first UE ID; and transmit a request associated with paging with the second UE ID and the pre-paging configuration.

19. The apparatus of claim 16, wherein the time and frequency resource assignment and the temporary UE ID are associated with a setup time and a validity duration.

20. The apparatus of claim 18, wherein the request is a pre-paging request, and wherein to transmit the request, the one or more processors are configured to cause the first network entity to transmit the request based at least in part on an expiration of a timer that starts after a paging request.

21. The apparatus of claim 18, wherein to transmit the request, the one or more processors are configured to cause the first network entity to transmit the request in response to reception of a UE context release message.

22. An apparatus for wireless communication at a second network entity, comprising:

one or more memories; and one or more processors, coupled to the one or more memories, configured to cause the second network entity to:

transmit a pre-paging configuration with a first user equipment (UE) identifier (ID) to a first network entity;

receive, with information associated with the first UE ID, a request, with the pre-paging configuration, associated with paging from the first network entity; and transmit a pre-paging message to a UE associated with the first UE ID.

23. The apparatus of claim 22, wherein the information associated with the first UE ID includes the first UE ID, and wherein the request is a pre-paging request.

24. The apparatus of claim 22, wherein the information associated with the first UE ID includes a second UE ID and information associated with derivation of the first UE ID, and wherein the request is a pre-paging request.

25. The apparatus of claim 24, wherein the information associated with derivation of the first UE ID includes one or more of a second UE ID associated with the UE, a 5G serving temporary mobile subscriber identity (S-TMSI), geographical area information of the UE, a bit map, a masking function, or a predefined function.

26. The apparatus of claim 22, wherein the information associated with the first UE ID includes the first UE ID, and wherein the request is a paging request.

27. The apparatus of claim 22, wherein the information associated with the first UE ID includes information associated with derivation of the first UE ID, wherein the request is a paging request, and wherein the one or more processors are further configured to cause the second network entity to derive the first UE ID based at least in part on the information associated with derivation of the first UE ID.

28. The apparatus of claim 22, wherein the one or more processors are further configured to cause the second network entity to select the pre-paging message.

29. The apparatus of claim 27, wherein the pre-paging configuration indicates a time and frequency resource assignment by the second network entity.

30. The apparatus of claim 22, wherein to receive the request, the one or more processors are configured to cause the second network entity to receive the request in response to transmission of a UE context release message.

* * * * *